United States Patent
Lin et al.

(10) Patent No.: US 10,073,316 B2
(45) Date of Patent: Sep. 11, 2018

(54) ACHROMATIC PHASE MODULATOR AND OPTICAL DEVICE

(71) Applicants: ESSILOR INTERNATIONAL (COMPAGNIE GENERALE D'OPTIQUE), Charenton le Pont (FR); NIKON CORPORATION, Minato-ku, Tokyo (JP)

(72) Inventors: Yi-Hsin Lin, Zhubei (TW); Hung-Shan Chen, Taichung (TW); Ming-Syuan Chen, New Taipei (TW)

(73) Assignees: Essilor International, Charenton le Pont (FR); Nikon Corporation, Tokyo (JP)

( * ) Notice: Subject to any disclaimer, the term of this patent is extended or adjusted under 35 U.S.C. 154(b) by 61 days.

(21) Appl. No.: 15/301,223

(22) PCT Filed: Apr. 2, 2014

(86) PCT No.: PCT/JP2014/060234
§ 371 (c)(1),
(2) Date: Sep. 30, 2016

(87) PCT Pub. No.: WO2015/151298
PCT Pub. Date: Oct. 8, 2015

(65) Prior Publication Data
US 2017/0017104 A1  Jan. 19, 2017

(51) Int. Cl.
*G02F 1/1347* (2006.01)
*G02F 1/139* (2006.01)
(Continued)

(52) U.S. Cl.
CPC ............ *G02F 1/1393* (2013.01); *G02F 1/137* (2013.01); *G02F 1/13471* (2013.01);
(Continued)

(58) Field of Classification Search
CPC ........... G02F 1/133528; G02F 1/13363; G02F 1/1337; G02F 1/1393; G02F 1/1313;
(Continued)

(56) References Cited

U.S. PATENT DOCUMENTS 6,028,656 A   2/2000  Buhrer et al.
8,023,052 B1  9/2011  Osterman et al.

FOREIGN PATENT DOCUMENTS

JP   H02-183219 A   7/1990
JP   H03-009319 A   1/1991
(Continued)

OTHER PUBLICATIONS

International Search Report from International Patent Application No. PCT/JP2014/060234, dated Oct. 9, 2014.
(Continued)

*Primary Examiner* — Thoi Duong
(74) *Attorney, Agent, or Firm* — Shapiro, Gabor and Rosenberger, PLLC

(57) ABSTRACT

An achromatic phase modulator that modulates a phase of linearly polarized light and outputs the linearly polarized light having undergone phase modulation, comprises: at least two liquid crystal elements disposed in series on a light path of the linearly polarized light, which are constituted with liquid crystal materials with refractive index wavelength dependence characteristics thereof different from each other; and a control unit for applying specific drive electric signals individually to the liquid crystal elements so as to achieve achromatic phase modulation for the linearly polarized light, wherein a polarization direction of the linearly polarized light entering the phase modulator matches the polarization direction of the linearly polarized light exiting the phase modulator.

15 Claims, 17 Drawing Sheets refractive index: $n_o(\lambda)$ refractive index: $n_e(\lambda)$

(51) Int. Cl.
*G02F 1/1337* (2006.01)
*G02F 1/137* (2006.01)

(52) U.S. Cl.
CPC .............. *G02F 2001/13706* (2013.01); *G02F 2001/13712* (2013.01); *G02F 2001/133738* (2013.01); *G02F 2001/133742* (2013.01); *G02F 2203/04* (2013.01)

(58) Field of Classification Search
CPC ............ G02F 1/133634; G02F 1/1347; G02F 1/13471; G02F 1/13; G02F 1/133; G02F 1/0136; G02F 1/1335; G02F 2001/133531; G02F 2001/13712; G02F 2413/02; G02F 2413/11; G02F 2413/08; G02F 2203/04; G02F 2203/07; G02F 2203/50; G02B 27/26; G02B 27/286; G02B 5/3016; G02B 5/3083; G02B 5/30; G02B 6/0056; G02B 21/0068; G03F 7/001; G03F 7/70566; G11B 7/128; B32B 2307/42; B32B 2457/202
USPC ..... 349/96, 33, 194, 118, 123, 193, 130, 74, 349/77, 132, 201
See application file for complete search history.

(56) References Cited

FOREIGN PATENT DOCUMENTS

| | | |
|---|---|---|
| JP | 2009-014778 A | 1/2009 |
| JP | 2013-538368 A | 10/2013 |
| WO | WO 2012/130302 A1 * | 10/2012 ........... G02F 1/1347 |

OTHER PUBLICATIONS

Office Action dated Dec. 12, 2017 in Japanese Patent Application No. 2017-503206.

* cited by examiner liquid crystal element 1    liquid crystal element 2 liquid crystal element 11  liquid crystal element 12  liquid crystal element 13 negative type (N-type)

positive type (P-type)

ACHROMATIC PHASE MODULATOR AND OPTICAL DEVICE

TECHNICAL FIELD

The present invention relates to an achromatic phase modulator that modulates the phase of incident light by using liquid crystal elements and outputs the light having undergone the phase modulation.

BACKGROUND ART

A great deal of attention has been focused on technological development pertaining to phase modulation achieved via liquid crystal elements in recent years. Such efforts have led to, for instance, an invention according to which a transmissive spatial light modulating element is used as an image information source for a digital hologram recording device (see patent literature 1). The publication cited above discloses that the use of a nematic liquid crystal element for purposes for modulating phase and intensity makes it possible to output light without rotating the plane of polarization.

CITATION

Patent Literature

Patent Literature 1: Japanese laid open patent publication no. 2009-14778

SUMMARY OF THE INVENTION

Technical Problem

The phase modulator disclosed in patent literature 1 can only be utilized in conjunction with light at a single specific wavelength, since the extent of phase modulation (phase modulation quantity) is bound to change from one light wavelength to another. This means that it is not capable of executing phase modulation with a high degree of accuracy for a color image formed with light originating from, for instance, a white light source. For this reason, achromatic phase modulators capable of achieving a substantially uniform phase modulation quantity in correspondence to light at any wavelength within a wide wavelength range, such as the visible light wavelength range, are of great interest. It is to be noted that while another liquid crystal element is disposed on the light-entry side in the invention disclosed in patent literature 1, this liquid crystal element is used for purposes of light intensity adjustment and is not relevant to the phase modulation.

An object of the present invention is to provide a transmissive achromatic phase modulator adopting a simple structure and that is capable of executing achromatic phase modulation in conjunction with light over a wide wavelength range.

Solution to Problems

According to the first aspect of the present invention, an achromatic phase modulator that modulates phase of a linearly polarized light and outputs the linearly polarized light having undergone phase modulation, comprises: at least two liquid crystal elements disposed in series on a light path of the linearly polarized light, which are constituted with liquid crystal materials with refractive index wavelength dependence characteristics thereof different from each other; and a control unit for applying drive electric signals individually to the liquid crystal elements so as to achieve achromatic phase modulation for the linearly polarized light, wherein in each liquid crystal element, an alignment directions of liquid crystal molecules therein can be altered between a first alignment direction substantially parallel to a direction in which the linearly polarized light advances, and a second alignment direction substantially parallel to the polarization direction of the linearly polarized light, in a plane including the first alignment direction and the second alignment direction, in correspondence to the drive electric signal applied to the liquid crystal element, and the polarization direction of the linearly polarized light entering the phase modulator coincides with the polarization direction of the linearly polarized light exiting the phase modulator.

According to the second aspect of the present invention, in the achromatic phase modulator according to the first aspect, it is preferred that the linearly polarized light has a wavelength within a visible range.

According to the third aspect of the present invention, the achromatic phase modulator according to the first or second aspect, further comprises: a linear polarizer, wherein: the linear polarizer converts incoming light to the linearly polarized light.

According to the fourth aspect of the present invention, in the achromatic phase modulator according to any one of the first through third aspect, it is preferred that the drive electric signals are each provided as a voltage; the liquid crystal elements are all nematic liquid crystal elements.

According to the fifth aspect of the present invention, in the achromatic phase modulator according to the fourth aspect, it is preferred that by setting the alignment direction of the liquid crystal molecules at each liquid crystal element in correspondence to the voltage, a first modulation condition under which an extent of modulation equals a first modulation quantity and a second modulation condition under which the extent of modulation equals a second modulation quantity different from the first modulation quantity can be achieved; and at one liquid crystal element among the liquid crystal elements, a refractive index for light having a given wavelength in the first modulation condition is greater than the refractive index in the second modulation condition, whereas at another liquid crystal element, the refractive index for light having the given wavelength in the first modulation condition is smaller than the refractive index in the second modulation condition.

According to the sixth aspect of the present invention, in the achromatic phase modulator according to the fifth aspect, it is preferred that the liquid crystal elements are a first liquid crystal element and a second liquid crystal element; and at the first liquid crystal element, the refractive index for light having the given wavelength in the first modulation condition is greater than the refractive index in the second modulation condition, whereas at the second liquid crystal element, the refractive index for light having the given wavelength in the first modulation condition is smaller than the refractive index in the second modulation condition.

According to the seventh aspect of the present invention, in the achromatic phase modulator according to the sixth aspect, it is preferred that the alignment direction of liquid crystal molecules in the first liquid crystal element assumes the first alignment direction while the voltage is not being applied thereto whereas the alignment direction of liquid crystal molecules in the second liquid crystal element assumes the second alignment direction while the voltage is not being applied thereto.

According to the eighth aspect of the present invention, in the achromatic phase modulator according to the fifth aspect, it is preferred that the liquid crystal elements are a first liquid crystal element, a second liquid crystal element and a third liquid crystal element; and at the first liquid crystal element and the second liquid crystal element, refractive indices for light having the given wavelength in the first modulation condition are both greater than the refractive indices in the second modulation condition, whereas at the third liquid crystal element the refractive index for light having the given wavelength in the first modulation condition is smaller than the refractive index in the second modulation condition at the third liquid crystal element, or at the first liquid crystal element and the second liquid crystal element, refractive indices for light having the given wavelength in the first modulation condition are both smaller than the refractive indices in the second modulation condition, whereas at the third liquid crystal element the refractive index for light having the given wavelength in the first modulation condition is greater than the refractive index in the second modulation condition at the third liquid crystal element.

According to the ninth aspect of the present invention, in the achromatic phase modulator according to the eighth aspect, it is preferred that the alignment directions of the liquid crystal molecules at the first liquid crystal element, the second liquid crystal element and the third liquid crystal element are all in the first alignment direction while no voltage is being applied thereto.

According to the tenth aspect of the present invention, in the achromatic phase modulator according to any one of the first through ninth aspects, it is preferred that thicknesses of liquid crystal material layers at the liquid crystal elements are set so as to achieve any extents of phase modulation falling within the range between zero and the maximum phase modulation by controlling the drive electric signals to be applied to each of the liquid crystal elements.

According to the eleventh aspect of the present invention, in the achromatic phase modulator according to any one of the first through tenth aspects, it is preferred that wherein: any extents of phase modulation falling within the range between zero and the maximum phase modulation can be obtained by controlling the drive electric signals to be applied to each of the liquid crystal elements.

According to the twelfth aspect of the present invention, in the achromatic phase modulator according to any one of the first through eleventh aspects, it is preferred that the thicknesses of the liquid crystal material layers at the liquid crystal elements are all set equal to or less than 30 μm.

According to the thirteenth aspect of the present invention, in the achromatic phase modulator according to any one of the first through twelfth aspect, it is preferred that the liquid crystal elements are each divided into a plurality of separate divisional liquid crystal areas arranged in a two-dimensional array; the divisional liquid crystal areas arrayed at one liquid crystal element corresponds to the divisional liquid crystal areas at another liquid crystal element; and the control means executes control so as to apply a drive electric signal individually to each of the divisional liquid crystal areas.

According to the fourteenth aspect of the present invention, an optical device comprising an achromatic phase modulator comprises the achromatic phase modulator according to first through thirteenth aspects.

According to the fifteenth aspect of the present invention, the optical device according to the fourteenth aspect, it is preferred that a haze is equal to 2% or less.

The present invention also concerns an optical device comprising such achromatic phase modulator. The optical device, might be one of an ophthalmic lens, an ocular visor, and sight optical systems, the ophthalmic lens is a lens which is designed to fit a spectacles frame so as to protect the eye and/or correct the sight and can be a non-corrective (also called plano or afocal lens) or corrective ophthalmic lens. Corrective lens may be a unifocal, a bifocal, a trifocal or a progressive lens. An ocular visor is understood as such found in masks, goggles, helmets or other headgears, and being designed to be positioned in front of the eyes, here, goggles and masks refer to for example ski goggles or scuba or snorkelling masks, protection goggles, and other similar devices.

The optical device according to the present invention can be an ophthalmic lens which has a curvature. The optical device according to the present invention has a haze equal 2% or less and preferably no greater than 0.4%. The haze value is measured by light transmission measurement using the Haze-Guard Plus© haze meter manufactured by BYK-Gardner (or a color difference meter) according to the method of ASTM D1003-00, which is incorporated herein in its entirety by reference. All references to "haze" values in this application are by this standard. The instrument is first calibrated according to the manufacturer's instructions. Next, the sample is placed on the transmission light beam of the pre-calibrated meter and the haze value is recorded from three different specimen locations and averaged.

Advantageous Effect of the Invention

The present invention provides a transmissive achromatic phase modulator adopting a simple structure, which is capable of executing tunable achromatic phase modulation for light in a wide wavelength range.

DESCRIPTION OF EMBODIMENTS

Figure 12A:
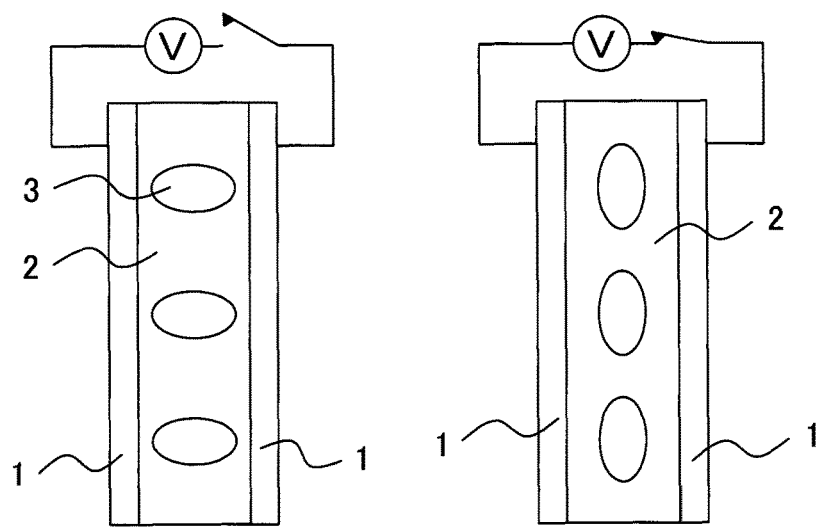
FIG. 12A and FIG. 12B illustrate liquid crystal molecular alignment observed in (a) vertical aligned liquid crystal element filled with a negative dielectric anisotropy liquid crystals material (N-type) and (b) an anti-parallel aligned liquid crystal element filled with a positive dielectric anisotropy liquid crystal material (P-type).
Figure 12B:
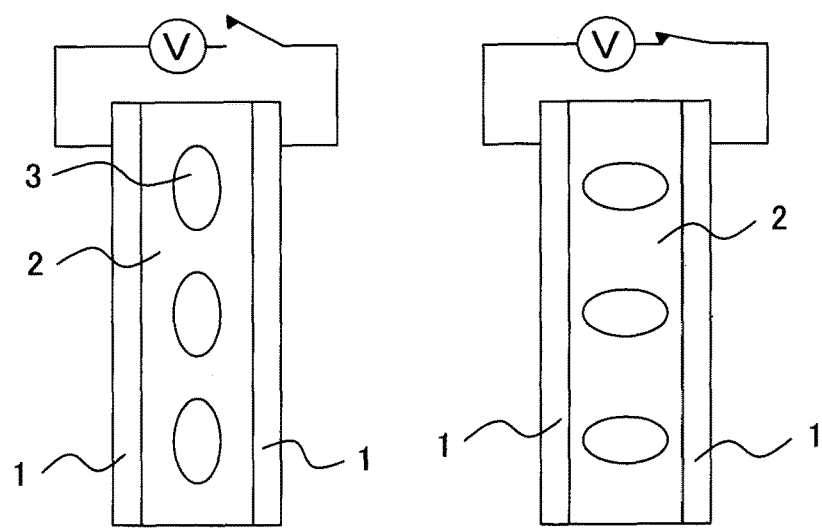

The phase modulator according to the present invention includes at least two liquid crystal elements each having liquid crystal molecules in a liquid crystal material sealed between substrates. In FIGS. 12A and 12B, reference numeral 1 and reference 2 respectively indicate a substrate and a liquid crystal material. The ellipses denoted with the reference numeral 3 each depict liquid crystal molecules. Indeed, nematic liquid crystal molecules are elongated molecules and are usually represented as rods or ellipsoids to illustrate their uniaxial anisotropic properties. Furthermore, the slow-axis of a liquid crystal molecule usually corresponds to the direction of the major ellipse axis. These reference numerals 1, 2 and 3 will also indicate the same elements in figures other than FIGS. 12A and 12B. The liquid crystal molecules inside the liquid crystal elements may be tilted along any direction between a direction that is parallel to a plane comprising the direction of the linear polarized light and the direction perpendicular to the substrate surfaces. In practice, these liquid crystal elements could be described under the generic term of zero-twist liquid crystal elements, for which the azimuthal alignment directions are parallel to the drawing sheet. When the liquid crystal molecules tilt orthogonally to the substrates, they do not twist.

There are common two types of zero-twist liquid crystal elements. FIG. 12A depicts cross sectional view of vertical aligned liquid crystal element and FIG. 12B depicts cross sectional view of anti-parallel aligned liquid crystal element. It is considered that azimuthal alignment direction is parallel to the drawing sheet. In other words, rubbing directions or pre-tilt azimuthal directions are parallel within a liquid crystal element.

In FIG. 12A, the vertical aligned liquid crystal element is associated with a liquid crystal material having a negative dielectric anisotropy, next denoted as N-type. In FIG. 12B, the anti-parallel aligned liquid crystal element is associated with a liquid crystal material having a positive dielectric anisotropy, next denoted as P-type. When no drive electric signal (voltage) is being applied to the vertical aligned liquid crystal element (FIG. 12A), the N-type liquid crystal molecules in the liquid crystal element are aligned along a direction perpendicular to the substrate surfaces (this direction will hereafter be referred to as a first alignment direction). When sufficiently high voltage is being applied as the drive electric signal, the liquid crystal molecules tilt along the direction parallel to the substrate surfaces (hereafter will be referred to as a second alignment direction).

When no drive electric signal is being applied to the anti-parallel liquid crystal element shown in FIG. 12B, the alignment direction of the liquid crystal molecules are in the second alignment direction and as a sufficient high voltage is being applied as the drive electric signal, the alignment direction of the P-type liquid crystal molecules tilt to the first alignment direction.

Figure 13A:
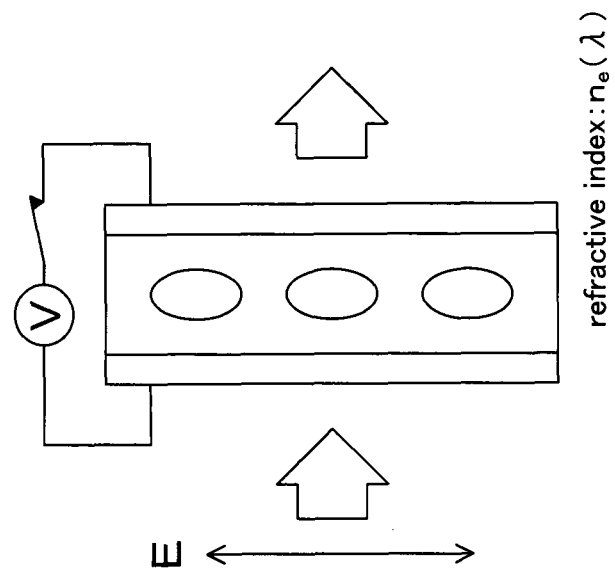
FIG. 13A and FIG. 13B illustrate phase modulation achieved via an N-type vertically aligned liquid crystal element.
Figure 13B:
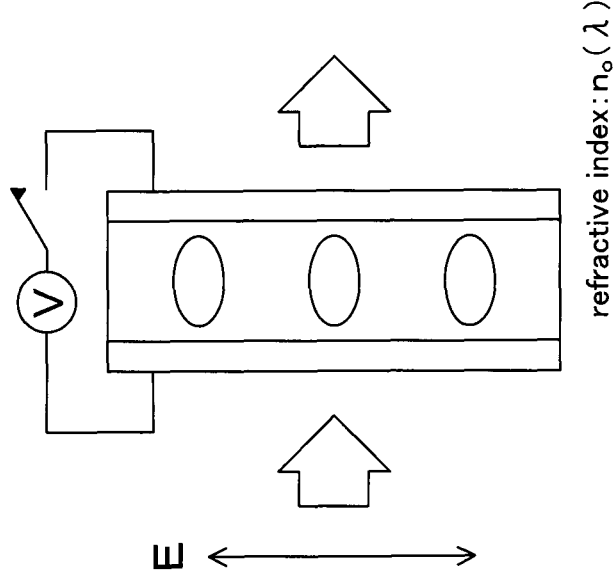

As part of a comprehensive presentation of the phase modulator according to the present invention, phase modulation of light achieved via a vertically aligned liquid crystal element will be first described. In the following description, it is assumed that all liquid crystal molecules have the same alignment at a given drive electric signal. For example, the anchoring effect of liquid crystal molecules at the substrate vicinity will not be taken into account. FIGS. 13A and 13B show how linearly polarized light having a wavelength λ enters an N-type vertically aligned liquid crystal element to undergo phase modulation. As the letter E indicates, the linearly polarized light will have been polarized along a direction parallel to the drawing sheet. As FIG. 13A indicates, when no drive electric signal (voltage) is being applied to the liquid crystal element, the liquid crystal molecules are aligned along a direction parallel to the direction in which the linearly polarized light enters. Namely, the direction of the liquid crystal molecules is in the first alignment direction. FIG. 13B shows the preferential alignment of the liquid crystal molecules assumed when a sufficiently high voltage is being applied as the drive electric signal. As FIG. 13B indicates, the direction of the liquid crystal molecules in this state is aligned along the direction parallel to the polarization direction of the linearly polarized light. In other words, the direction of the liquid crystal molecules is in the second alignment direction. The direction in which the liquid crystal molecules are tilted changes in correspondence to the voltage applied to the liquid crystal element, in the plane including the first alignment direction and the second alignment direction, within the range between the first alignment direction and the second alignment direction.

The refractive index of the liquid crystal material with regard to the incoming linearly polarized light changes in correspondence to the direction of the liquid crystal molecule tilt. The effective refractive index will correspond to the refractive index experienced by the linearly polarized light as it passes through a liquid crystal element. Generally speaking, the ordinary refractive index $n_o(\lambda)$ of the liquid crystal material for light having the wavelength λ in the state shown in FIG. 13A is smaller than the extraordinary refractive index $n_e(\lambda)$ of the liquid crystal material for the light with the wavelength λ in the state shown in FIG. 13B. Namely, a relationship expressed as; $n_o(\lambda) < n_e(\lambda)$ exists, and as the alignment direction of the liquid crystal molecules initially assuming the first alignment direction shifts into the second alignment direction, the refractive index increases from $n_o(\lambda)$ to $n_e(\lambda)$.

With d representing the thickness of the liquid crystal material layer in the liquid crystal element, a phase $Ø_o$ of the outgoing linearly polarized light exiting from the liquid crystal element with the alignment direction of the liquid crystal molecules assuming the first alignment direction and a phase $Ø_e$ of the outgoing linearly polarized light exiting from the liquid crystal element with the liquid crystal molecules assuming the second alignment direction are respectively expressed as;

$$Ø_o(\lambda) = 2\pi d n_o(\lambda)/\lambda$$

$$Ø_e(\lambda) = 2\pi d n_e(\lambda)/\lambda$$

Accordingly, the phase modulation $\Delta Ø$, occurring as the alignment direction of the liquid crystal molecules, initially sustaining the first alignment direction, changes to the second alignment direction, can be expressed as in (1) below.

$$\Delta Ø = Ø_e - Ø_o = 2\pi d(n_e(\lambda) - n_o(\lambda))/\lambda \quad (1)$$

Figure 14:
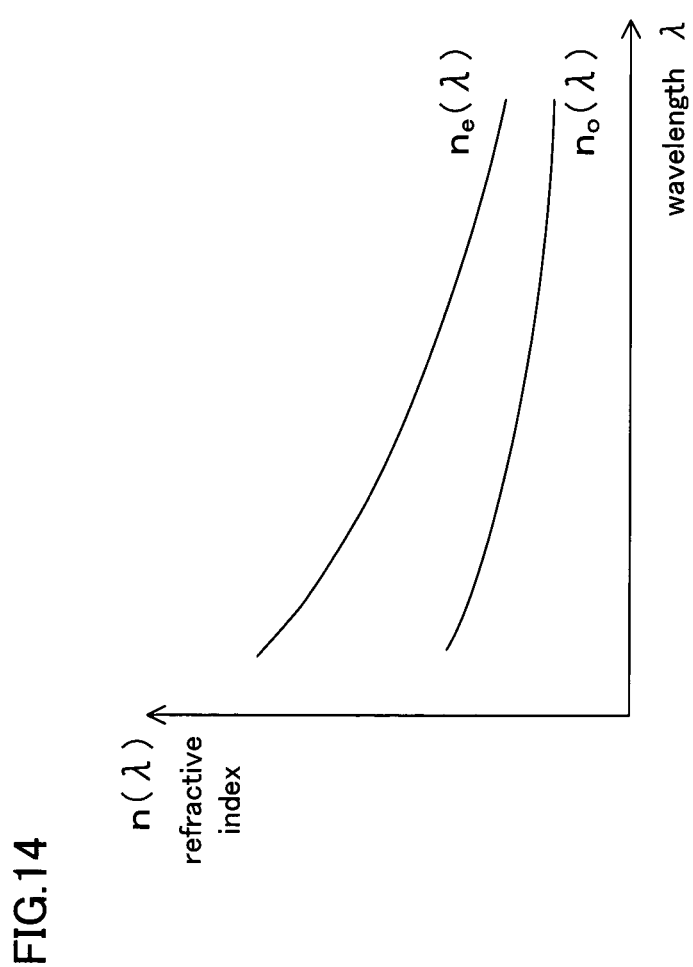
FIG. 14 provides a schematic presentation of the refractive index wavelength dependence characteristics of a liquid crystal material.

The ordinary refractive index $n_o(\lambda)$ and the extraordinary refractive index $n_e(\lambda)$ of the liquid crystal material respectively change in correspondence to the wavelength $\lambda$ of the incoming light. In addition, the effective refractive index of the liquid crystal material with the alignment direction of the liquid crystal molecules assuming an alignment direction between the first alignment direction and the second alignment direction, too, changes in correspondence to the wavelength $\lambda$ of the incoming light. This phenomenon will be referred to as "refractive index wavelength dependence" in this description. FIG. 14 provides a schematic presentation of the refractive index wavelength dependence. Under normal circumstances, as the wavelength $\lambda$ increases, both $n_o(\lambda)$ and $n_e(\lambda)$ decrease and their difference, i.e., $n_e(\lambda) - n_o(\lambda)$, too, decreases. It is to be noted that the effective refractive index of the liquid crystal material with the liquid crystal molecules aligned between the first alignment direction and the second alignment direction, too, changes as do $n_o(\lambda)$ and $n_e(\lambda)$. In practice, the effective refractive index $n_{eff}$ at the wavelength $\lambda$ for a tilt angle $\alpha$ of the liquid crystal molecule direction with the normal to the substrate can be expressed as in (2) below;

$$n_{eff}(\lambda, \alpha) = 1/\sqrt{[(\sin^2(\alpha)/n_e(\lambda)) + (\cos^2(\alpha)/n_o(\lambda))]} \quad (2)$$

As expression (1) clearly indicates, the denominator increases and the numerator decreases as the wavelength $\lambda$ becomes greater and thus, the phase modulation $\Delta Ø$ decreases as the wavelength $\lambda$ increases. In other words, the value representing the phase modulation $\Delta Ø$ is dependent upon the wavelength, which clearly demonstrates that achromatic phase modulation cannot be achieved via a single liquid crystal element.

Figure 2:
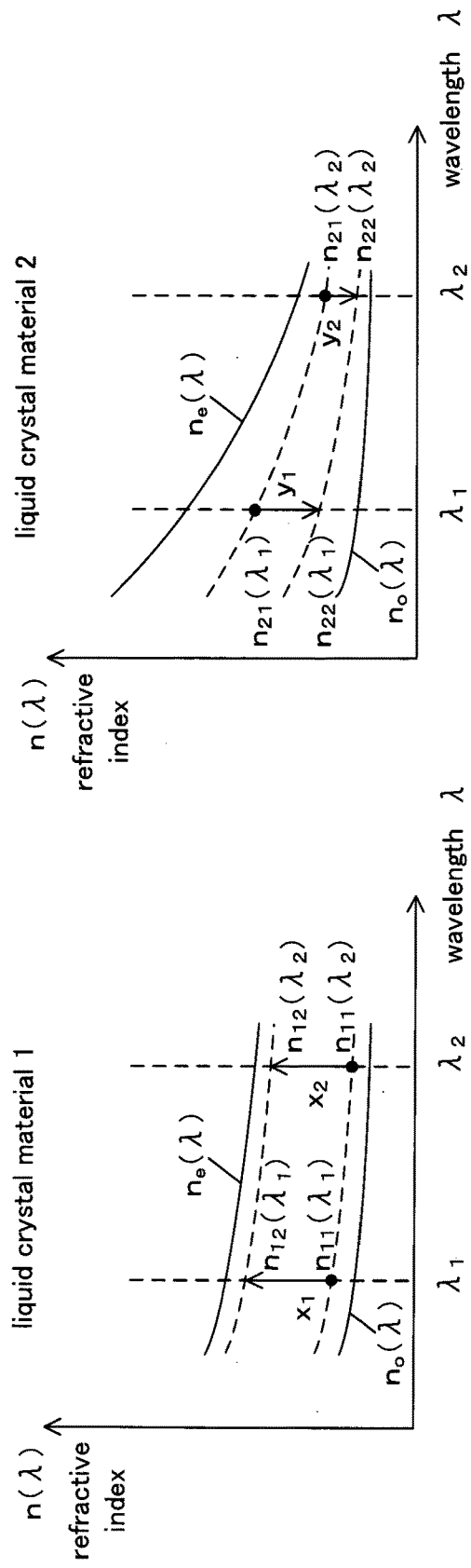
FIG. 2A and FIG. 2B present graphs indicating the refractive index wavelength dependence characteristics of two types of liquid crystal materials.

The inventor of the present invention drew the conclusion that by disposing in series and orthogonal to the propagation direction of the linearly polarized light at least two liquid crystal elements constituted with liquid crystal materials having different refractive index wavelength dependence characteristics and controlling electric signals applied to the liquid crystal elements, achromatic phase modulation for linearly polarized light can be achieved. In reference to FIGS. 2A and 2B, different refractive index wavelength dependence characteristics will be described. FIG. 2A presents a schematic graph showing the refractive index dependence of a liquid crystal material 1 having a relatively low level of refractive index wavelength dependence, whereas FIG. 2B presents a schematic graph of the refractive index dependence of a liquid crystal material 2 having a relatively high level of refractive index wavelength dependence. In each of these graphs, the solid line on the lower side represents the ordinary refractive index $n_o(\lambda)$ of the liquid crystal material with the alignment direction of the liquid crystal molecules assuming the first alignment direction and the solid line on the upper side represents the extraordinary refractive index $n_e(\lambda)$ of the liquid crystal material with the liquid crystal molecules assuming the second alignment direction.

As FIG. 2A indicates, the ordinary refractive index $n_o(\lambda)$ and the extraordinary refractive index $n_e(\lambda)$ of the liquid crystal material 1, corresponding to the state in which the alignment direction of the liquid crystal thereof is respectively in the first alignment direction and the second alignment direction, both change only to relatively small extents even as the wavelength $\lambda$ changes. This means that the difference between $n_e(\lambda)$ and $n_o(\lambda)$ does not change greatly even as the wavelength $\lambda$ changes, either.

The ordinary refractive index $n_o(\lambda)$ and the extraordinary refractive index $n_e(\lambda)$ of the liquid crystal material 2, on the other hand, change to greater extents as the wavelength $\lambda$ changes, compared to the extents of change in the refractive indices of the liquid crystal material 1, as FIG. 2B indicates. The extraordinary refractive index $n_e(\lambda)$ changes particularly greatly as the wavelength $\lambda$ changes. Thus, as the wavelength $\lambda$ increases, the difference between $n_e(\lambda)$ and $n_o(\lambda)$ decreases to a greater extent.

Figure 1:
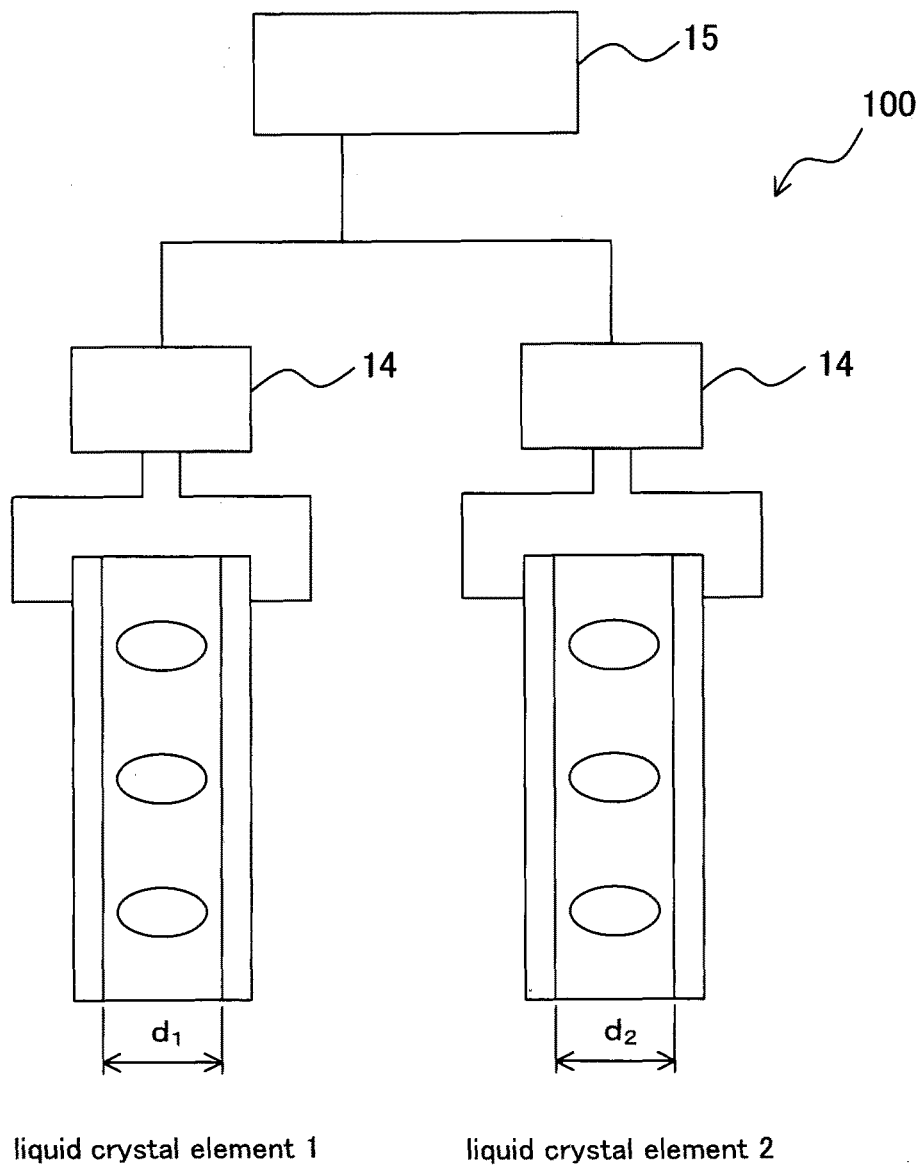
FIG. 1 is a schematic diagram showing the structure of an achromatic phase modulator according to the present invention, which is configured with two liquid crystal elements.

The achromatic phase modulator according to the present invention is achieved by configuring a phase modulator with the liquid crystal material 1 and the liquid crystal material 2 having different refractive index wavelength dependence characteristics, as explained above. FIG. 1 shows a phase modulator 100 configured as described above. Two liquid crystal elements, one constituted with the liquid crystal material 1 and the other constituted with the liquid crystal material 2, are disposed in series in the phase modulator 100. The thicknesses of the liquid crystal material layers in the liquid crystal element 1 and the liquid crystal element 2 are respectively set to $d_1$ and $d_2$. Power sources 14 are connected to the liquid crystal element 1 and the liquid crystal element 2 so as to provide voltages to be applied to the individual liquid crystal elements. The voltages applied from the power sources 14 to the liquid crystal element 1 and the liquid crystal element 2 are controlled by a control device 15. It is to be noted that there are no restrictions whatsoever with regard to the order in which the liquid crystal material 1 and the liquid crystal material 2 are disposed. In other words, the linearly polarized light may enter either of these liquid crystal elements first. As mentioned above, in each liquid crystal element, the alignment direction of liquid crystal molecules therein can be altered between the first alignment direction substantially parallel to the direction in which the linearly polarized light advances, and the second alignment direction substantially parallel to the polarization direction of the linearly polarized light, in the plane including the first alignment direction and the second alignment direction, in correspondence to the drive electric signal applied to the liquid crystal element, and the polarization direction of the linearly polarized light entering the phase modulator coincides with the polarization direction of the linearly polarized light exiting the phase modulator.

Next, in reference to FIGS. 2A and 2B, a method adopted when modulating the phase of linearly polarized light by inputting linearly polarized light having a wavelength $\lambda$ at the phase modulator 100 and controlling electric signals applied to the liquid crystal element 1 and the liquid crystal element 2 will be described. Through control of the voltages applied to the liquid crystal element 1 and the liquid crystal element 2, the effective refractive index at the liquid crystal element 1 is increased from $n_{11}(\lambda_1)$ to $n_{12}(\lambda_1)$ for light having a wavelength $\lambda_1$, whereas the effective refractive index at the liquid crystal element 2 is decreased from $n_{21}(\lambda_1)$ to $n_{22}(\lambda_1)$ for light having the wavelength $\lambda_1$. These changes in the effective refractive indices are indicated by the arrows marked $x_1$ and $y_1$ in FIGS. 2A and 2B respectively.

In this situation, the effective refractive index at the liquid crystal element 1 increases from $n_{11}(\lambda_2)$ to $n_{12}(\lambda_2)$ for light having the wavelength $\lambda_2$, whereas the refractive index at the liquid crystal element 2 decreases from $n_{21}(\lambda_2)$ to $n_{22}(\lambda_2)$ for light with the same wavelength $\lambda_2$. These changes in the refractive indices are indicated by the arrows marked $x_2$ and $y_2$ in FIGS. 2A and 2B respectively.

Figure 3:
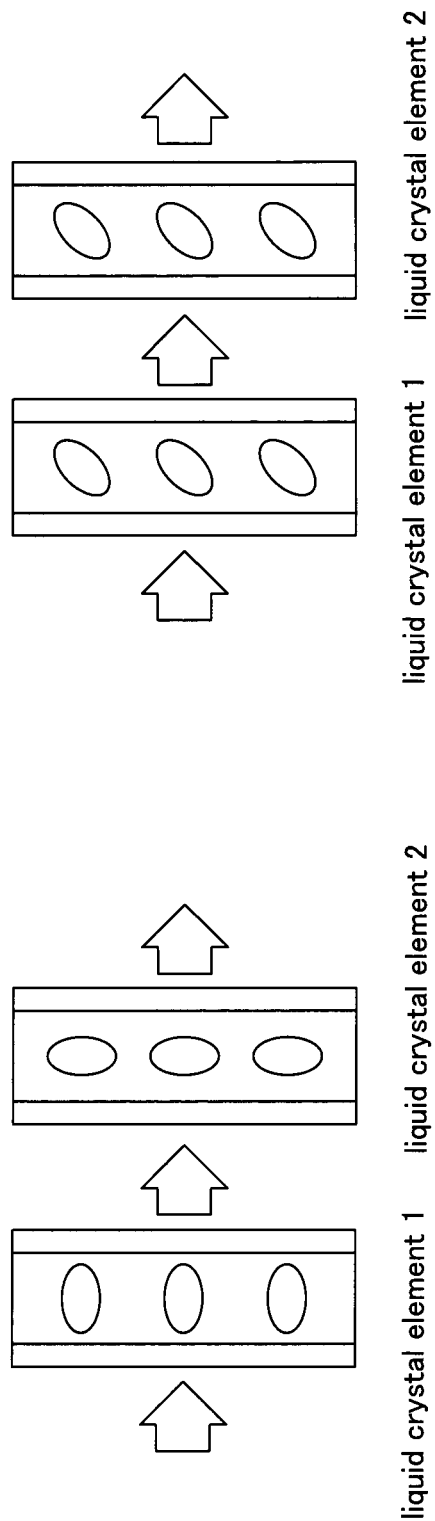
FIG. 3A and FIG. 3B schematically illustrate how the direction of the alignment of liquid crystal molecules changes through phase modulation.

The changes in the effective refractive indices must occur along opposite directions at the liquid crystal element 1 and the liquid crystal element 2. Namely, in conducting on achieving a phase modulation, the effective refractive index at the liquid crystal element 2 needs to decrease if the effective refractive index at the liquid crystal element 1 is to increase, whereas the effective refractive index at the liquid crystal element 2 needs to increase if the effective refractive index at the liquid crystal element 1 is to decrease. FIGS. 3A and 3B show how the liquid crystal molecules may behave in this situation. By tilting liquid crystal molecules from the state shown in FIG. 3A to the state shown in FIG. 3B, phase modulation is achieved.

The phase modulations achieved via the liquid crystal element 1 and the liquid crystal element 2 for the incoming linearly polarized light having the wavelength $\lambda_1$ are respectively expressed as;

$$\Delta\emptyset_1(\lambda_1) = 2\pi[(n_{12}(\lambda_1) - n_{11}(\lambda_1))d_1]/\lambda_1$$

$$\Delta\emptyset_2(\lambda_1) = 2\pi[(n_{22}(\lambda_1) - n_{21}(\lambda_1))d_2]/\lambda_1$$

Thus, the total phase modulation $\Delta\emptyset(\lambda_1)$ is expressed as;

$$\begin{aligned}\Delta\emptyset(\lambda_1) &= \Delta\emptyset_1(\lambda_1) + \Delta\emptyset_2(\lambda_1) \\ &= 2\pi[(n_{12}(\lambda_1) - n_{11}(\lambda_1))d_1 + (n_{22}(\lambda_1) - n_{21}(\lambda_1))d_2]/\lambda_1 \\ &= 2\pi(x_1 d_1 + y_1 d_2)/\lambda_1\end{aligned} \quad (3)$$

Likewise, the phase modulation $\Delta\emptyset(\lambda_2)$ achieved for the incoming linearly polarized light having the wavelength $\lambda_2$ is expressed as;

$$\begin{aligned}\Delta\emptyset(\lambda_2) &= 2\pi[(n_{12}(\lambda_2) - n_{11}(\lambda_2))d_1 + (n_{22}(\lambda_2) - n_{21}(\lambda_2))d_2]/\lambda_2 \\ &= 2\pi(x_2 d_1 + y_2 d_2)/\lambda_2\end{aligned} \quad (4)$$

It is to be noted that as the arrows in FIGS. 2A and 2B indicate; for $\lambda_1 < \lambda_2$, for this specific configuration of two liquid crystal elements:

$$x_1 = n_{12}(\lambda_1) - n_{11}(\lambda_1) > 0$$

$$y_1 = n_{22}(\lambda_1) - n_{21}(\lambda_1) < 0$$

$$x_2 = n_{12}(\lambda_2) - n_{11}(\lambda_2) > 0$$

$$y_2 = n_{22}(\lambda_2) - n_{21}(\lambda_2) < 0$$

Also, $$x_1 - x_2 > 0$$

$$y_1 - y_2 < 0$$

As FIGS. 2A and 2B clearly indicate, the difference between $x_1$ and $x_2$ is small but the difference between $y_1$ and $y_2$ is significant in comparison. This means that a condition expressed as; $x_1 + y_1 < x_2 + y_2$ can exist. By transposing $x_2$ and $y_1$ this expression can be rewritten as; $x_1 - x_2 < y_2 - y_1$. This expression indicates that the thickness $d_1$ and the thickness $d_2$ of the liquid crystal material layers constituting the liquid crystal element 1 and the liquid crystal element 2 can be set so as to satisfy a condition expressed as;

$$(x_1 - x_2)d_1 < (y_2 - y_1)d_2 \quad (5)$$

Namely, $d_1$ and $d_2$ can be set so that $(x_1 - x_2)/(y_2 - y_1) < d_2/d_1$ is satisfied. Expression (5) indicates that $(x_2 d_1 + y_2 d_2)$ in expression (4) is greater than $(x_1 d_1 + y_1 d_2)$ in expression (3). In other words, the numerator in expression (4) for the phase modulation achieved for light having the greater wavelength $\lambda_2$ is greater than the numerator in expression (3) for the phase modulation achieved for light having the smaller wavelength $\lambda_1$. Thus, a conclusion is drawn that $x_1$, $y_1$, $x_2$, $y_2$, $d_1$ and $d_2$ can be set so as to equalize $(x_1 d_1 + y_1 d_2)/(x_2 d_1 + y_2 d_2)$ to $\lambda_1/\lambda_2$. Namely, $x_1$, $y_1$, $x_2$ and $y_2$, through the choice of the two liquid crystals materials and the two designed wavelengths, $d_1$ and $d_2$ can be set (by solving the two equation linear system with two remaining unknown values) so that below expression (6) is satisfied.

$$(x_1 d_1 + y_1 d_2)/(x_2 d_1 + y_2 d_2) = \lambda_1/\lambda_2 \quad (6)$$

When expression (6) is satisfied, $\Delta\emptyset(\lambda_1) = \Delta\emptyset(\lambda_2)$, it means that achromatic phase modulation is achieved for at least two wavelength.

As described above, achromatic phase modulation can be achieved by selecting the optimal values for the thicknesses of the liquid crystal material layers constituting the liquid crystal element 1 and the liquid crystal element 2, the optimal refractive index wavelength dependence characteristics to be manifested by these liquid crystal materials and the optimal settings for the changes in the refractive effective indices at the liquid crystal elements. It is to be noted that the extents of change in the effective refractive indices at the liquid crystal elements may be set by, for instance, controlling the voltages applied to the liquid crystal elements.

While phase modulation is achieved in conjunction with light at two particular different wavelengths $\lambda_1$ and $\lambda_2$ in the example described above, achromatic phase modulation may also be achieved in conjunction with a greater number of wavelengths within a specific wavelength range. For instance, achromatic phase modulation for a maximum phase shift level of $2\pi\mathrm{rad}$ may be achieved with the phase modulation error attributable to the varying wavelengths kept down to a value equal to or less than $0.1\pi$ rad for light with wavelengths over the visible light wavelength range of 400 nm through 700 nm.

Even more accurate achromatic phase modulation can be achieved with a phase modulator configured with a greater number of liquid crystal elements. For instance, an achromatic phase modulator configured with three liquid crystal elements will assure even less error attributable to the varying wavelengths. In this configuration, control should be executed for the phase modulation so that the effective refractive index at one liquid crystal element among the three liquid crystal elements changes in a manner opposite to that with which the effective refractive indices at the remaining two liquid crystal elements change. Namely, if the effective refractive indices at the two liquid crystal elements are to increase, the effective refractive index at the remaining liquid crystal element should decrease, whereas if the effective refractive indices at the two liquid crystal elements are to decrease, the effective refractive index at the remaining liquid crystal element should increase.

Figure 10:
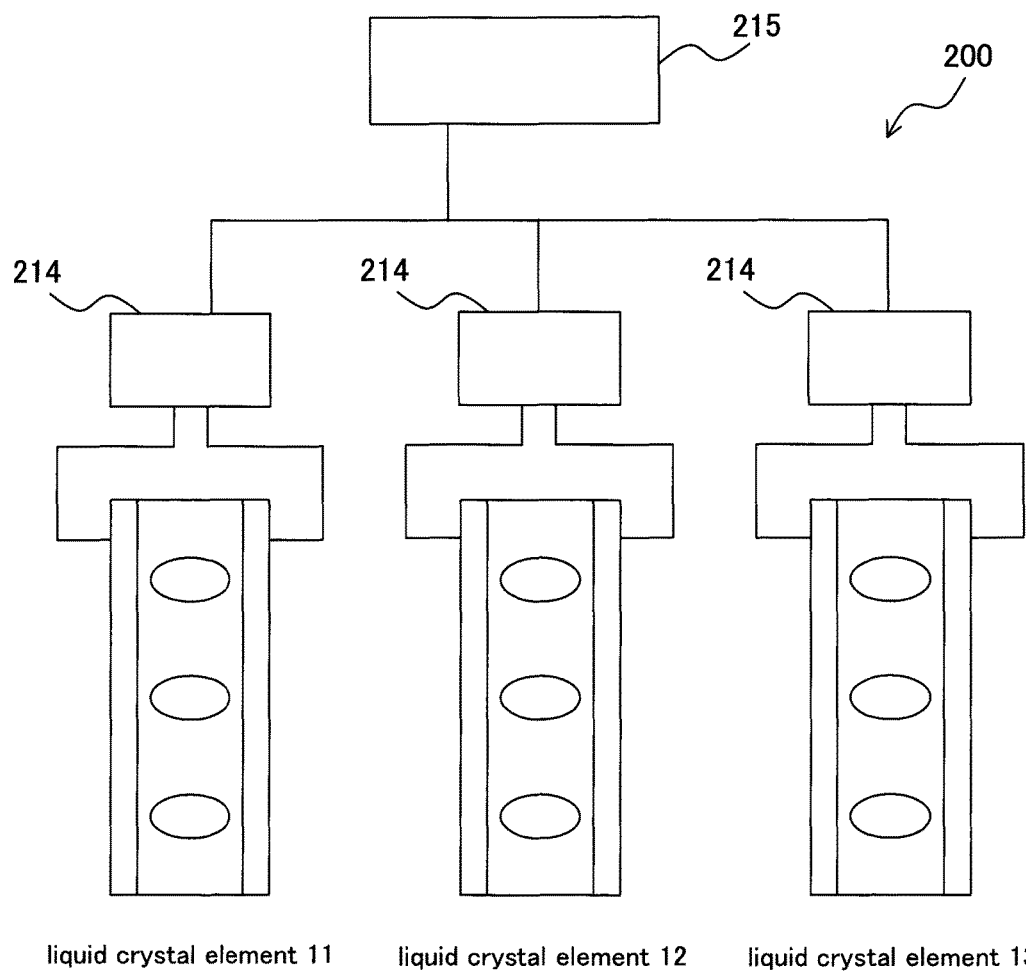
FIG. 10 is a schematic diagram showing the structure of an achromatic phase modulator according to the present invention.

FIG. 10 shows a phase modulator 200 configured as described above. $d_1$, $d_2$ and $d_3$ respectively represent the thicknesses of the liquid crystal material layers in the three liquid crystal elements (i.e., a liquid crystal element 11, a liquid crystal element 12 and a liquid crystal element 13). The phase modulation $\Delta\emptyset(\lambda_1)$ achieved via these three liquid crystal elements on an incoming linearly polarized light having a wavelength $\lambda_1$ by altering the effective refractive indices of the liquid crystal materials so that from $n_{11}(\lambda_1)$ to $n_{12}(\lambda_1)$, from $n_{21}(\lambda_1)$ to $n_{22}(\lambda_1)$ and from $n_{31}(\lambda_1)$ to $n_{32}(\lambda_1)$ is expressed as;

$$\Delta\emptyset(\lambda_1)=2\pi(x_1d_1+y_1d_2+z_1d_3)/\lambda_1 \qquad (7)$$

$x_1$, $y_1$ and $z_1$ in the expression above respectively represent $n_{12}(\lambda_1)-n_{11}(\lambda_1)$, $n_{22}(\lambda_1)-n_{21}(\lambda_1)$ and $n_{32}(\lambda_1)-n_{31}(\lambda_1)$. In the same time, the phase modulation $\Delta\emptyset(\lambda_2)$ achieved for incoming linearly polarized light having a wavelength $\lambda_2$ is expressed as;

$$\Delta\emptyset(\lambda_2)=2\pi(x_2d_1+y_2d_2+z_2d_3)/\lambda_2 \qquad (8)$$

$x_2$, $y_2$ and $z_2$ in the expression above respectively represent $n_{12}(\lambda_2)-n_{11}(\lambda_2)$, $n_{22}(\lambda_2)-n_{21}(\lambda_2)$ and $n_{32}(\lambda_2)-n_{31}(\lambda_1)$.
In the same time, the phase modulation $\Delta\emptyset(\lambda_3)$ achieved for incoming linearly polarized light having a wavelength $\lambda_3$ is expressed as;

$$\Delta\emptyset(\lambda_3)=2\pi(x_3d_1+y_3d_2+z_3d_3)/\lambda_3 \qquad (9)$$

$x_3$, $y_3$ and $z_3$ in the expression above respectively represent $n_{12}(\lambda_3)-n_{11}(\lambda_3)$, $n_{22}(\lambda_3)-n_{21}(\lambda_3)$ and $n_{32}(\lambda_3)-n_{31}(\lambda_3)$.
Using expressions (7), (8) and (9), optimal values are selected for $x_1$, $y_1$ $z_1$, $x_2$, $y_2$ and $z_2$, through the choice of the three liquid crystals materials and the three designed wavelengths, and $d_1$, $d_2$ and $d_3$ (by solving the linear equation systems of three equations and three remaining unknown values) so as to achieve a relationship expressed as;

$$(x_1d_1+y_1d_2+z_1d_3)/\lambda_1=(x_2d_1+y_2d_2+z_2d_3)/\lambda_2=(x_3d_1+y_3d_2+z_3d_3)/\lambda_3 \qquad (10)$$

Through this process, conditions under which achromatic phase modulation is achieved are determined. It is to be noted that the three liquid crystal elements may be disposed in any order.

Embodiment 1: Simulation of an Achromatic Phase Modulator with Two Liquid Crystal Elements

Figure 4:
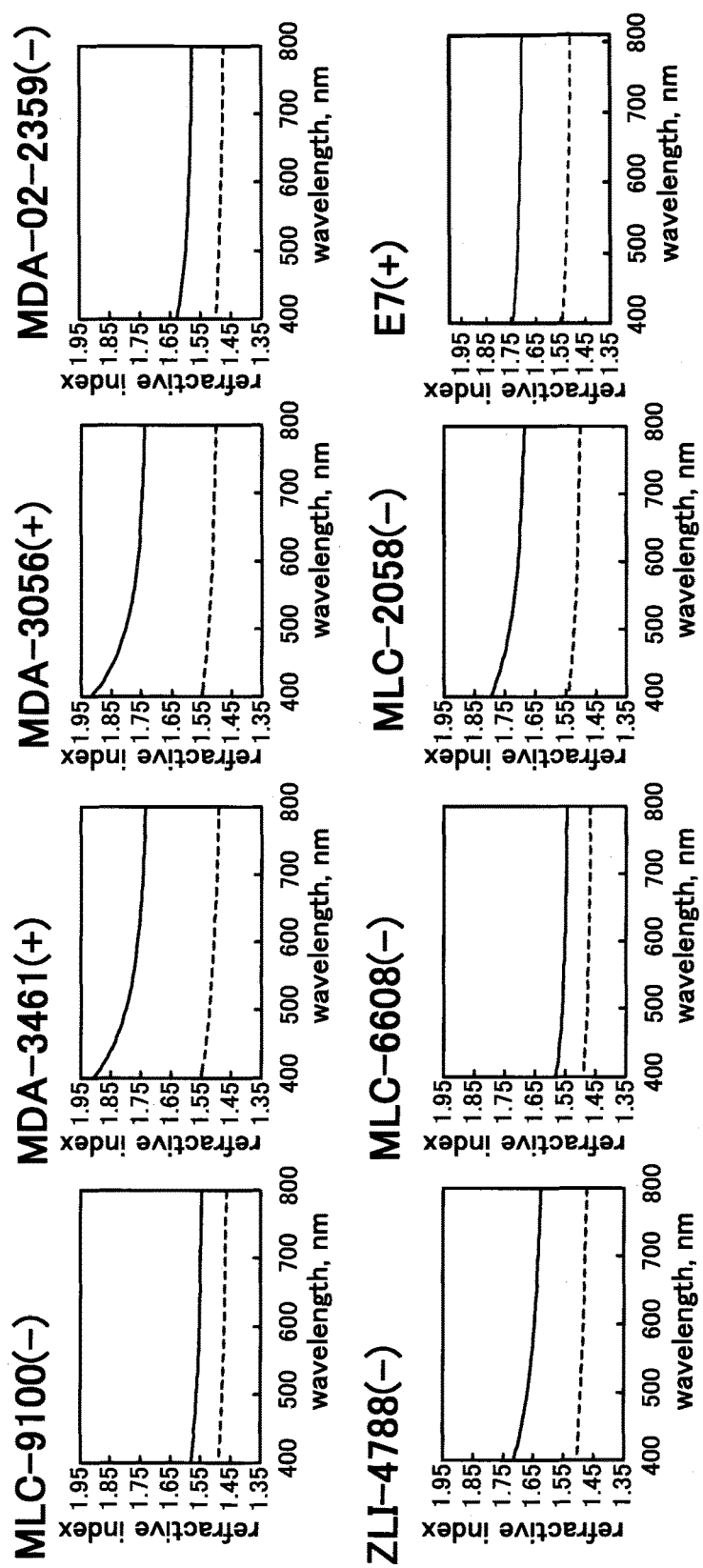
FIG. 4 presents graphs indicating several examples of the refractive index wavelength dependence characteristics of liquid crystal material.

[Selection of Liquid Crystal Materials]
Various nematic liquid crystal elements are prepared.
Firstly, the refractive index wavelength dependence characteristics of the various liquid crystal materials are ascertained. The refractive index wavelength dependence characteristics corresponding to both the ordinary refractive index $n_o(\lambda)$ and the extraordinary refractive index $n_e(\lambda)$. Such refractive index wavelength dependence characteristics can be described using Cauchy's dispersion formula. FIG. 4 presents several examples of the refractive index wavelength dependence characteristics that may be determined as described above in schematic representation.
Next, two liquid crystal materials among these liquid crystal materials are selected and the thicknesses of the individual liquid crystal material layers of hypothetical liquid crystal elements constituted with these liquid crystal materials are determined through calculation for a maximum phase modulation. In more specific terms, values for $d_1$ and $d_2$, representing the thicknesses of the two liquid crystal material layers, are calculated by ensuring that the relationship expressed in (11) below for achieving a maximum phase shift $2\pi$rad is satisfied at two wavelengths, for, instance $\lambda=400$ nm and $\lambda=600$ nm, by altering the effective refractive index of each liquid crystal material occurring the liquid crystal material changing from the first alignment direction to the second alignment direction ($n_o$ to $n_e$) or from the second alignment direction to the first alignment direction ($n_e$ to $n_o$). As the values of $\Delta n_1(\lambda)$ and $\alpha n_2(\lambda)$ are known at both $\lambda=400$ nm and $\lambda=600$ nm, the values for $d_1$ and $d_2$ can be precisely calculated so that the expression (10) is verified at both wavelengths.

$$2\pi(\Delta n_1(\lambda)d_1+\Delta n_2(\lambda)d_2)/\lambda=2\pi \qquad (11)$$

$\Delta n_1(\lambda)$ and $\Delta n_2(\lambda)$ in the expression above are rewritten as;

$$\Delta n_1(\lambda)=n_{1e}(\lambda)-n_{1o}(\lambda) \text{ or } n_{1o}(\lambda)-n_{1e}(\lambda)$$

$$\Delta n_2(\lambda)=n_{2e}(\lambda)-n_{2o}(\lambda) \text{ or } n_{2o}(\lambda)-n_{2e}(\lambda)$$

$n_{1e}(\lambda)-n_{1o}(\lambda)$ and $n_{2e}(\lambda)-n_{2o}(\lambda)$ both take positive values, whereas $n_{1o}(\lambda)-n_{1e}(\lambda)$ and $n_{2o}-n_{2e}(\lambda)$ both take negative values.

As FIG. 4 clearly indicates, the absolute values of both $\Delta n_1(\lambda)$ and $\Delta n_2(\lambda)$ become smaller as the wavelength increases. In other words, the absolute values of both $\Delta n_1(\lambda)$ and $\Delta n_2(\lambda)$ decrease as the denominator on the left side of expression (11) increases (as the wavelength becomes greater). Thus, if $\Delta n_1(\lambda)$ and $\Delta n_2(\lambda)$ both take positive values or negative values, the extent of phase modulation decreases as $\lambda$ becomes greater, and under such circumstances, the relationship expressed in (11) cannot be achieved.

If either $\Delta n_1(\lambda)$ and $\Delta n_2(\lambda)$ takes a positive value and the other takes a negative value, conditions that allow the relationship expressed in (11) to be true exist, as has been explained in reference to FIGS. 2A and 2B.

In order to determine the values for $d_1$ and $d_2$, the following two expressions are obtained with respect to $d_1$ and $d_2$ by using two wavelengths 400 nm and 600 nm substituting for the wavelengths and substituting the values corresponding to these wavelengths for $\Delta n_1(\lambda)$ and $\Delta n_2(\lambda)$ in expression (11).

$$(\Delta n_1(400)d_1+\Delta n_2(400)d_2)=400 \text{ (nm)} \qquad (12)$$

$$(\Delta n_1(600)d_1+\Delta n_2(600)d_2)=600 \text{ (nm)} \qquad (13)$$

Since the values for $\Delta n_1(400)$, $\Delta n_2(400)$, $\Delta n_1(600)$ and $\Delta n_2(600)$ have already been determined through the calculation executed as expressed in Cauchy's dispersion formula, as has been explained earlier, the values for $d_1$ and $d_2$ can be calculated by using expression (12) and expression (13). Through this process, the thicknesses of the individual liquid crystal material layers can be calculated in correspondence to any combination of two different liquid crystal materials. Then, each combination of two different liquid crystal materials and the corresponding liquid crystal material layer thicknesses, which satisfy the following conditions, are selected by scrutinizing the plurality of combinations.
(i) The phase modulation error does not exceed 8% for maximum phase modulation set to $2\pi$ rad over the visible range from 400 nm to 700 nm.
(ii) The thickness of either liquid crystal material layer does not exceed 30 μm.

It is to be noted that the condition (ii) above is set since response times of liquid crystal elements increases with liquid crystal material thickness.

Among the combinations fulfilling the conditions defined above, the combination of two liquid crystal materials, MDA-02-2359 (manufactured by Merck) for the liquid crystal element 1 and E7 (manufactured by Merck) for the liquid crystal element 2, is selected for the phase modulator. The refractive index wavelength dependence characteristics of these liquid crystal materials are shown in FIG. 4. The thicknesses $d_1$ and $d_2$ of the two liquid crystal material layers in this combination are calculated to be 28.33 µm for the MDA-02-2359 and 11.06 µm for the E7 respectively. The effective refractive index differences, for the liquid crystal element 1 (MDA-02-2359) in which the alignment direction changes from the first alignment direction to the second alignment direction and for the liquid crystal element 2 (E7) in which the alignment direction changes from the second alignment direction to the first alignment direction, are respectively:

$$\Delta n_1(\lambda) = n_{1e}(\lambda) - n_{1o}(\lambda) > 0$$

$$\Delta n_2(\lambda) = n_{2o}(\lambda) - n_{2e}(\lambda) < 0$$

For the first modulation condition, the direction of alignment of the liquid crystal molecules in the liquid crystal element 1 (MDA-02-2359) and the liquid crystal element 2 (E7) is therefore respectively the first alignment direction and the second alignment direction. As it happens that the MDA-02-2359 is a liquid crystal material with negative dielectric anisotropy (N-type) and the E7 is a liquid crystal material with positive dielectric anisotropy (P-type), no voltage needs to be applied to both liquid crystal elements in the first modulation condition. Besides, it should be noted that in the first modulation condition, phase modulation is considered equal to zero in all the visible range.

[Simulation]

Control of the individual liquid crystal elements in the phase modulator configured by disposing the two liquid crystal elements in series will be next explained. In the range of zero and the maximum phase modulation of $2\pi$rad, the changes in the effective refractive indices of the liquid crystal elements required to achieve the particular extent of phase modulation are determined through repeated calculation executed to minimize the phase modulation error attributable to change of wavelength. There is a plurality of methods through which such effective refractive index changes can be determined. For instance, the effective refractive index of the liquid crystal element can be calculated from the alignment direction of the liquid crystal molecules (expression (2)). In more specific terms, for any particular extent of phase modulation $\Delta\varnothing_k$ between zero and the maximum phase modulation of $2\pi$rad, the first modulation condition remains the same, hence the alignment direction of the liquid crystal molecules in the liquid crystal element 1 (MDA-02-2359) and the liquid element 2 (E7) are respectively the first alignment direction and the second alignment direction. This first modulation condition could be referred to as the initial state. To determine the second modulation condition for a particular extent of phase modulation $\Delta\varnothing_k$, optimal effective refractive indices for the liquid crystal element 1 and liquid crystal element 2 can be calculated so as to minimize the phase modulation error to 0 for light having wavelengths at both 400 nm and 600 nm. Accordingly, the phase modulation $\Delta\varnothing_k$, occurring as the alignment of the liquid crystal molecules, initially sustaining the first modulation condition, changes to the second modulation condition, can be expressed as in the expression (14) below.

$$2\pi(\Delta n_1(\lambda,\alpha_1)d_1 + \Delta n_2(\lambda,\alpha_2)d)/\lambda = \Delta\varnothing_k \quad (14)$$

here, $$\Delta n_1(\lambda) = n_{1\mathit{eff}}(\lambda,\alpha_1) - n_{1o}(\lambda) > 0$$

$$\Delta n_2(\lambda) = n_{2\mathit{eff}}(\lambda,\alpha_2) - n_{2e}(\lambda) < 0$$

$\alpha_1$ and $\alpha_2$ are the alignment directions of the liquid crystal molecules in respectively liquid crystal element 1 and liquid crystal element 2. The effective refractive index $n_{\mathit{eff}}(\lambda, \alpha)$ is described by the expression (2). The phase modulation error is the absolute difference between $2\pi(\Delta n_1(\lambda,\alpha_1)d_1 + \Delta n_2(\lambda,\alpha_1)d_2)/\lambda$ and $\Delta\varnothing_k$ in expression (14). In practice, repeated calculations are executed to minimize the phase modulation error at the wavelengths of 400 nm and 600 nm. The optimization of the effective refractive indices of liquid crystal element 1 and liquid crystal element 2 is realized through the change of the alignment direction of liquid crystal molecules $\alpha_1$ and $\alpha_2$.

Figure 5:
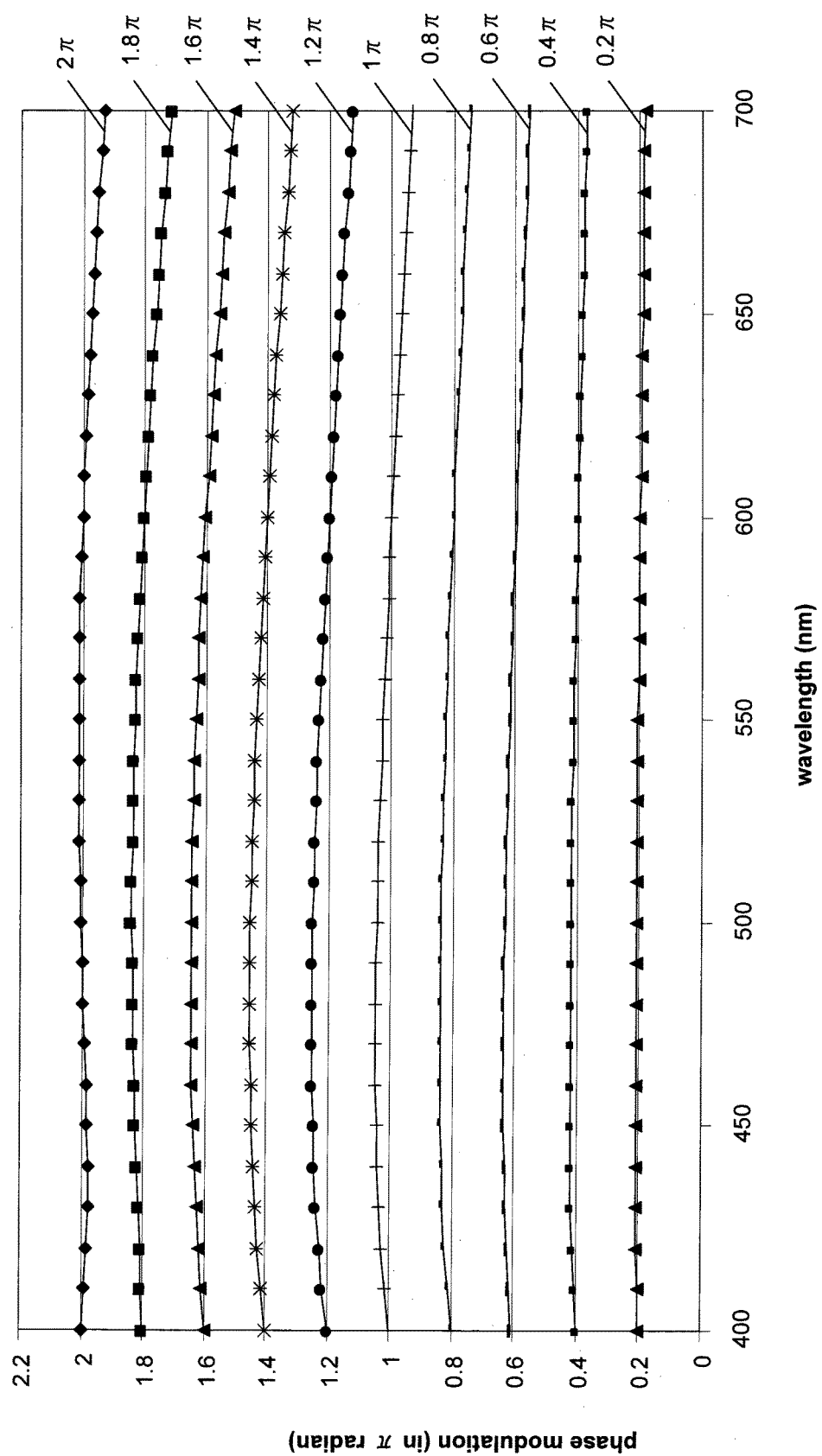
FIG. 5 presents calculation results pertaining to the phase modulation achieved by two liquid crystal elements.
Figure 6:
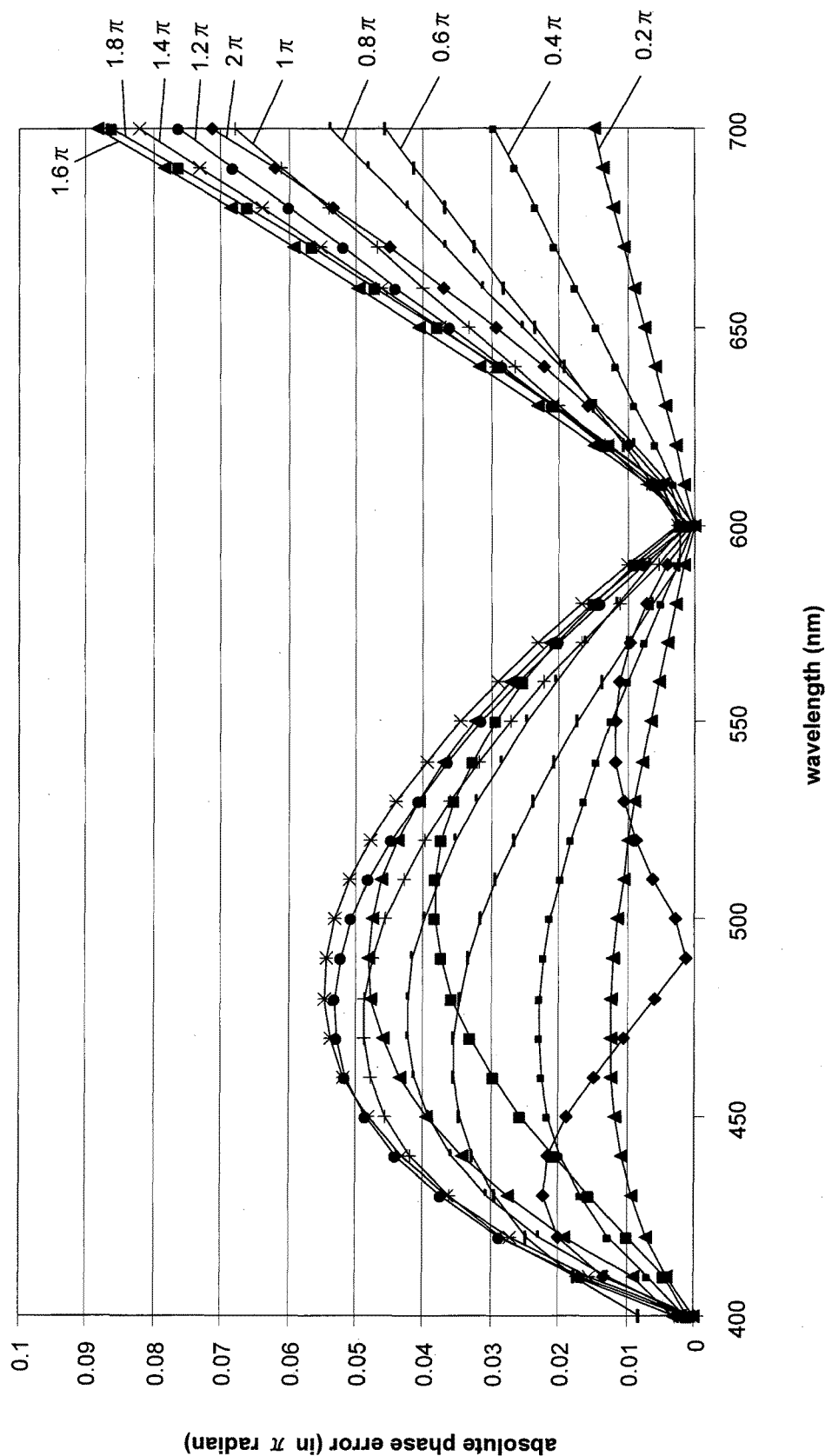
FIG. 6 presents calculation results pertaining to the error in the phase modulation achieved via two liquid crystal elements.

The result of simulation in this manner for phase modulation of $0\pi$ rad through $2\pi$ with $0.2\pi$ increments to various wavelengths of light in a range of 400 nm through 700 nm is shown in FIG. 5. Moreover, the calculated absolute phase errors are shown in FIG. 6. It should be noted that, although the optimization was carried at the wavelengths of 400 nm and 600 nm, the absolute phase shift errors for the different increments of phase shift modulation do not exceed $0.1\pi$ rad over the wavelength range from 400 nm to 700 nm.

Embodiment 2: Simulation of an Achromatic Phase Modulator with Three Liquid Crystal Elements

[Selection of Liquid Crystal Materials]

Three liquid crystal materials among the plurality of liquid crystal materials, the refractive wavelength dependence characteristics of which have been determined as described earlier, are selected and the thicknesses of the individual liquid crystal material layers of hypothetical liquid crystal elements constituted with these liquid crystal materials are determined through calculation. In more specific terms, values for $d_1$, $d_2$ and $d_3$ representing the thicknesses of the three liquid crystal material layers are calculated by ensuring that the relationship expressed in (15) below is satisfied for $\lambda=400$ nm, $\lambda=500$ nm and $\lambda=660$ nm in achieving a maximum phase shift $2\pi$ by altering the refractive index of each liquid crystal material by changing the alignment direction from the first alignment direction to the second alignment direction ($n_o$ to $n_e$) or from the second alignment direction to the first alignment direction ($n_e$ to $n_o$). As the values of $\Delta n_1(\lambda)$, $\Delta n_2(\lambda)$ and $\Delta n_3(\lambda)$ are known at both $\lambda=400$ nm, $\lambda=500$ nm and $\lambda=660$ nm, the values for $d_1$, $d_2$ and $d_3$ can be precisely calculated so that the expression (15) is verified at all these wavelengths.

$$2\pi(\Delta n_1(\lambda)d_1 + \Delta n_2(\lambda)d_2) + \Delta n_3(\lambda)d_3)/\lambda = 2\pi \quad (15)$$

$\Delta n_1(\lambda)$, $\Delta n_2(\lambda)$ and $\Delta n_3(\lambda)$ in the expression above are rewritten as;

$$\Delta n_1(\lambda) = n_{1e}(\lambda) - n_{1o}(\lambda) \text{ or } n_{1o}(\lambda) - n_{1e}(\lambda)$$

$$\Delta n_2(\lambda) = n_{2e}(\lambda) - n_{2o}(\lambda) \text{ or } n_{2o}(\lambda) - n_{2e}(\lambda)$$

$$\Delta n_3(\lambda) = n_{3e}(\lambda) - n_{3o}(\lambda) \text{ or } n_{3o}(\lambda) - n_{3e}(\lambda)$$

$n_{1e}(\lambda)-n_{1o}(\lambda)$, $n_{2e}(\lambda)-n_{2o}(\lambda)$ and $n_{3e}(\lambda)-n_{3o}(\lambda)$ both take positive values, whereas $n_{1o}(\lambda)-n_{1e}(\lambda)$, $n_{2o}-n_{2e}(\lambda)$ and $n_{3o}-n_{3e}(\lambda)$ both take negative values.

If $\Delta n_1(\lambda)$, $\Delta n_2(\lambda)$ and $\Delta n_3(\lambda)$ all take positive values or negative values in expression (15), the extent of phase modulation decreases as $\lambda$ becomes greater and under such circumstances, the relationship expressed in (15) cannot be achieved. If one or two among $\Delta n_1(\lambda)$, $\Delta n_2(\lambda)$ and $\Delta n_3(\lambda)$ takes a positive value and the remaining one or two takes a negative value, conditions that allow the relationship expressed in (15) to be true exist, as a concept similar to that described with regard to two different liquid crystal materials in reference to FIGS. 2A and 2B is applicable.

In order to determine the values for $d_1$, $d_2$ and $d_3$, the following three expressions are obtained with respect to $d_1$, $d_2$ and $d_3$ by using three wavelengths 400 nm, 500 nm and 660 nm substituting for the wavelength and substituting the values corresponding to these wavelengths for $\Delta n_1(\lambda)$, $\Delta n_2(\lambda)$ and $\Delta n_3(\lambda)$ in expression (15).

$$\Delta n_1(400)d_1+\Delta n_2(400)d_2+\Delta n_3(400)d_3=400 \text{ (nm)} \quad (16)$$

$$\Delta n_1(500)d_1+\Delta n_2(500)d_2+\Delta n_3(500)d_3=500 \text{ (nm)} \quad (17)$$

$$\Delta n_1(660)d_1+\Delta n_2(660)d_2+\Delta n_3(660)d_3=660 \text{ (nm)} \quad (18)$$

Since the values for $\Delta n_1(400)$, $\Delta n_2(400)$, $\Delta n_3(400)$, $\Delta n_1(500)$, $\Delta n_2(500)$, $\Delta n_3(500)$, $\Delta n_1(660)$, $\Delta n_2(660)$ and $\Delta n_3(660)$ have already been determined through the calculation executed as expressed in Cauchy's dispersion formula, as has been explained earlier, the values for $d_1$, $d_2$ and $d_3$ can be calculated by using expressions (16) through (18). Through this process, the thicknesses of the individual liquid crystal material layers can be calculated in correspondence to any combination of three different liquid crystal materials. Then, each combination of three different liquid crystal materials and the corresponding liquid crystal material layer thicknesses, which satisfy the following conditions, are selected by scrutinizing the plurality of combinations.

(i) The phase modulation error does not exceed 7% of $2\pi$ rad.

(ii) The thickness of any liquid crystal material layer does not exceed 30 μm.

Among the combinations fulfilling the conditions defined above, the combination of three liquid crystal materials, MDA-02-2359 (manufactured by Merck) for the liquid crystal 11, MLC-6608 (manufactured by Merck) for the liquid crystal 12 and ZLI-4788 (manufactured by Merck) for the liquid crystal 13, are selected for the phase modulator. The refractive index wavelength dependence characteristics of these liquid crystal materials are shown in FIG. 4. These liquid crystal materials all constitute negative dielectric anisotropy (N-type) liquid crystal elements. The thicknesses $d_1$, $d_2$ and $d_3$ of the three liquid crystal material layers in this combination are calculated to be respectively 23.78 μm for the MDA-02-2359, 14.31 μm for the MLC-6608 and 18.71 μm for the ZLI-4788. The effective refractive index differences, for the liquid crystal element 11 (MDA-02-2359) in which the alignment direction changes from the first alignment direction to the second alignment direction, for the liquid crystal element 12 (MLC-6608) in which the alignment direction changes from the first alignment direction to the second alignment direction, and for the liquid crystal element 13 (ZLI-4788) in which the alignment direction changes from the second alignment direction to the first alignment direction, are respectively:

$$\Delta n_1(\lambda)=n_{1e}(\lambda)-n_{1o}(\lambda)>0$$

$$\Delta n_2(\lambda)=n_{2e}(\lambda)-n_{2o}(\lambda)>0$$

$$\Delta n_3(\lambda)=n_{3o}(\lambda)-n_{3e}(\lambda)<0$$

As for the first modulation condition, the alignment directions of the liquid crystal molecules in the liquid crystal element 11 (MDA-02-2359), the liquid crystal element 12 (MLC-6608) and the liquid crystal element 13 (ZLI-4788) are therefore respectively the first alignment direction for the liquid crystal element 11 and the liquid crystal element 12 and the second alignment direction for the liquid crystal element 13.

[Simulation]

Figure 7:
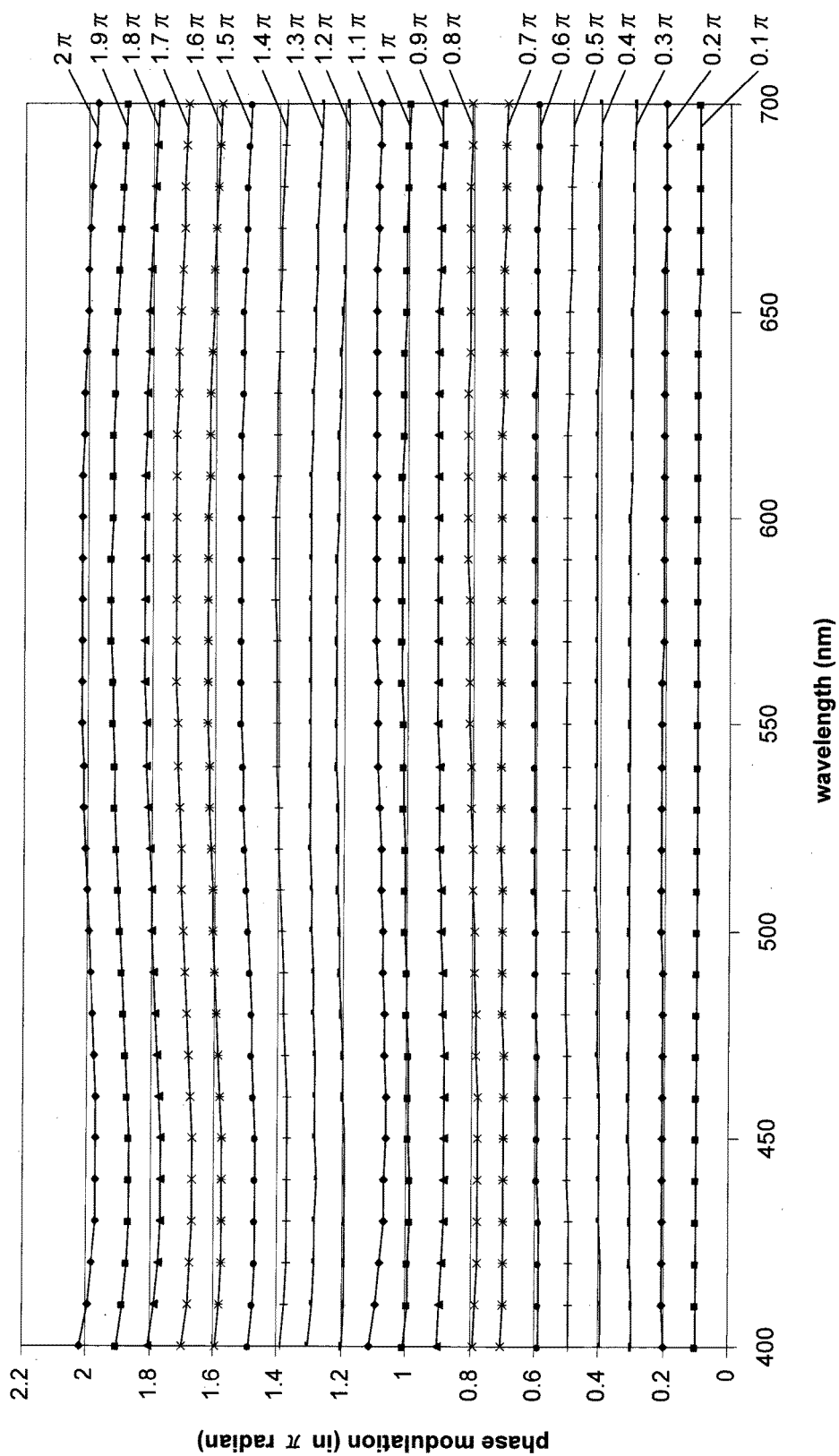
FIG. 7 presents calculation results pertaining to the phase modulation achieved by three liquid crystal elements.
Figure 8:
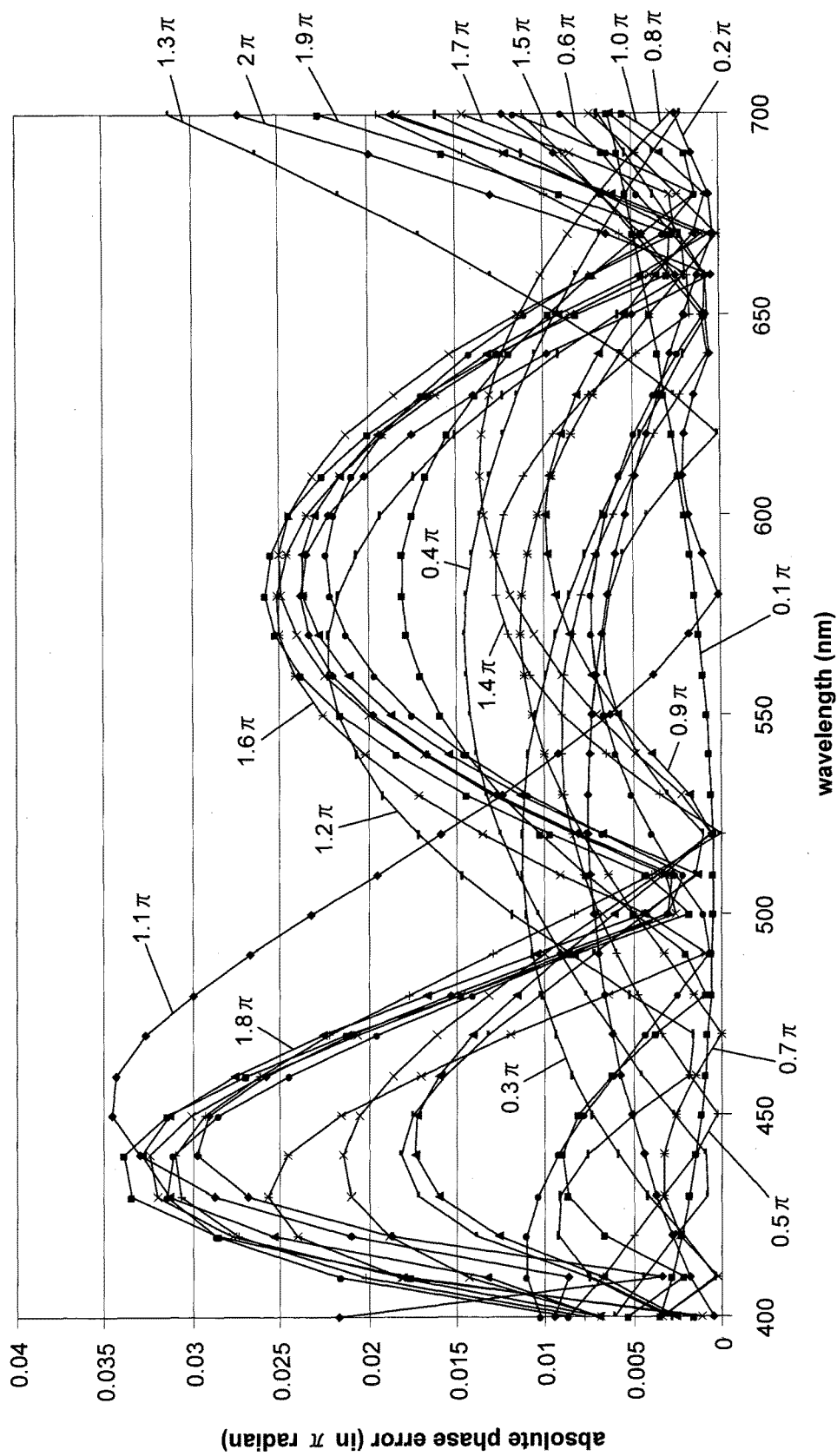
FIG. 8 presents calculation results pertaining to the error in the phase modulation achieved via three liquid crystal elements.

For a combination calculated as described above, simulations for phase modulation at various wavelengths of light in a range of 400 nm through 700 nm are conducted. For calculating maximum phase modulation of $2\pi$ rad, the ordinary refractive index $n_o$ and the extraordinary refractive index $n_e$ can be used already obtained by Cauchy's dispersion formula (see FIG. 4). For phase modulation other than the maximum phase modulation, calculating repeatedly by altering effective refractive index change to minimize phase modulation error. In more specific terms, the phase shift modulation $\Delta\varnothing_k$, occurring as the alignment of the liquid crystal molecules, initially sustaining the first modulation condition, changes to a second modulation condition, can be expressed as in the expression (19) below.

$$2\pi(\Delta n_1(\lambda,\alpha_1)d_1+\Delta n_2(\lambda,\alpha_1)d_2+\Delta n_3(\lambda,\alpha_3)d_3)/\lambda=\Delta\varnothing_k \quad (19)$$

here, $$\Delta n_1(\lambda)=n_{1\mathit{eff}}(\lambda,\alpha_1)-n_{1o}(\lambda)>0$$

$$\Delta n_2(\lambda)=n_{2\mathit{eff}}(\lambda,\alpha_2)-n_{2o}(\lambda)>0$$

$$\Delta n_3(\lambda)=n_{3\mathit{eff}}(\lambda,\alpha_3)-n_{3e}(\lambda)<0$$

where $\alpha_1$, $\alpha_2$ and $\alpha_3$ are the direction of alignment of the liquid crystal molecules in respectively liquid crystal element 11, liquid crystal element 12 and liquid crystal element 13. The effective refractive index $n_{\mathit{eff}}(\lambda, \alpha)$ is described by the expression (2). Repeated calculations are executed to minimize the phase shift modulation error at the wavelengths of 400 nm, 500 nm and 660 nm. The optimization of the effective refractive indices of liquid crystal element 1, liquid crystal element 2 and liquid crystal element 3 is realized through the change of the direction of alignment of liquid crystal molecules $\alpha_1$, $\alpha_2$ and $\alpha_3$. The result of simulation in this manner for phase modulation of OTC rad through $2\pi$ with $0.1\pi$ increments to various wavelengths of light in a range of 400 nm through 700 nm is shown in FIG. 7. Moreover, the calculated absolute phase errors are shown in FIG. 8. The absolute phase shift errors for the different increments of phase shift modulation do not exceed $0.035\pi$ rad over the wavelength range from 400 nm to 700 nm.

[Example of Method For Manufacturing a Liquid Crystal Element]

Following description is one example for method of manufacturing a liquid crystal element. An ITO (indium tin oxide) coating and polyimide coating are applied to a surface of each glass substrate making up a set of glass substrates, so as to form an electrode layer and an alignment layer respectively. Depending on the polyimide used, homogeneous or homeotropic alignment can be achieved: in the case of homogeneous alignment, the alignment layer can be rubbed along one direction to align the liquid crystal molecules at its vicinity parallel to the glass substrate and following the rubbing direction with a small pre-tilt angle of typically of few degrees. In the case of homeotropic alignment, the alignment layer can be gently rubbed along one direction to align the liquid crystal molecules at its vicinity almost perpendicular to the glass substrate and following a rubbing pre-tilt angle between 85 to 89 degrees.

The glass substrates are then disposed at fixed positions set apart from each other so as to allow the alignment layers formed thereat to face opposite each other. If the alignment layers are with homogeneous alignment and have anti-parallel rubbing directions, a liquid crystal material with a positive dielectric anisotropy is injected into the space between the glass substrates to form an anti-parallel aligned electrically controlled birefringence (ECB) liquid crystal cell. If the alignment layers are with homeotropic alignment and have anti-parallel rubbing directions, a liquid crystal material with a negative dielectric anisotropy is injected into the space between the glass substrates to form an vertically aligned (VA) electrically controlled birefringence (ECB) liquid crystal cell. The gap between the glass substrates is set so that the liquid crystal material layer in the finished liquid crystal element achieves a predetermined thickness. The liquid crystal element is manufactured by fixing lead wires to the electrode layers after sealing in the liquid crystal material.

[Example of Method for Setting Voltages to be Applied]

Figure 9:
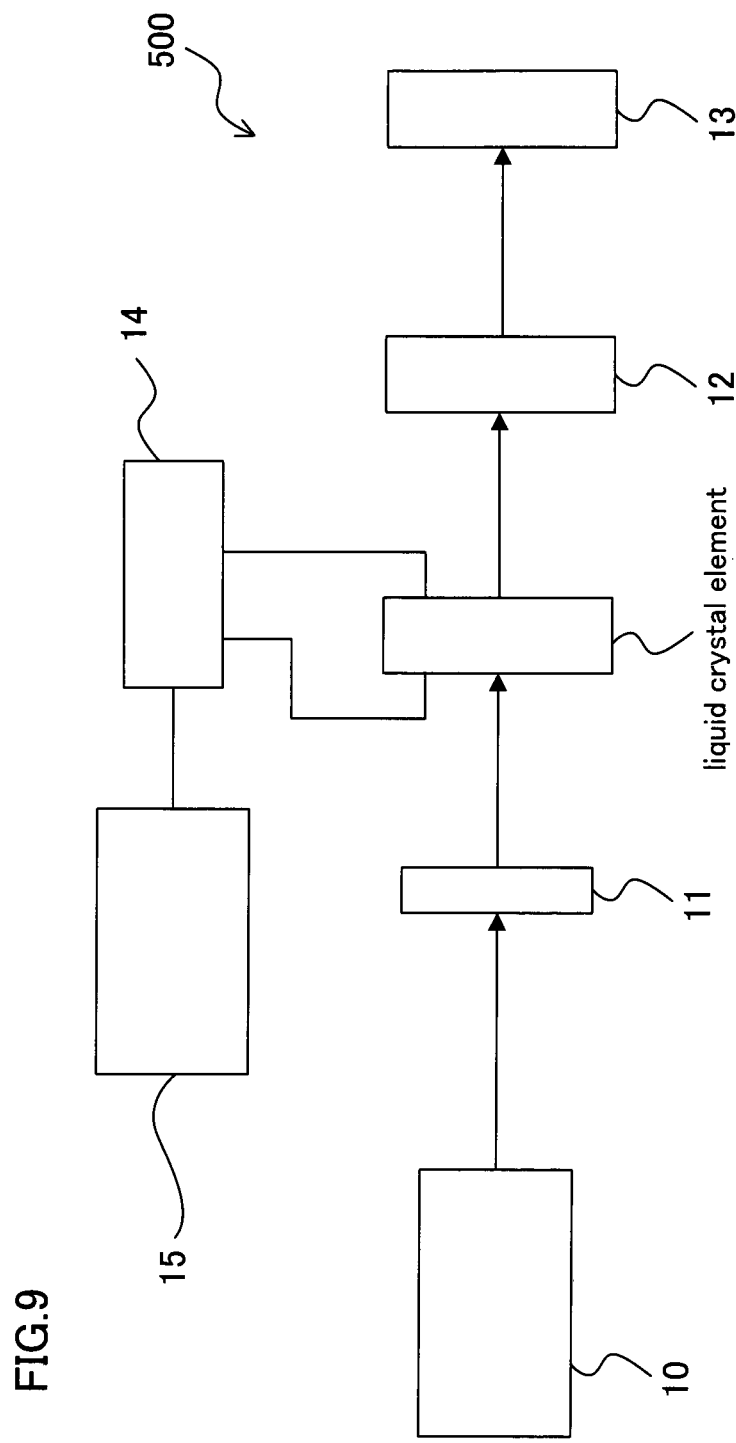
FIG. 9 is a schematic diagram showing the structure of a phase measurement device used to set a voltage to be applied to a liquid crystal element.

One example of method that may be adopted when determining the values for the voltages to be applied to the individual liquid crystal elements in order to achieve the refractive index changes at the liquid crystal elements will be described next. A phase measuring setup 500 shown in FIG. 9 is used to measure the phase modulation achieved via a liquid crystal element. The phase measuring setup 500 shown in FIG. 9 comprises a laser light source 10 that emits light having a wavelength of 632.8 nm, a first polarizing plate 11 and a second polarizing plate 12 disposed so that the transmission axes thereof extend perpendicular to each other, and a light intensity detector 13. The first polarizing plate 11, the second polarizing plate 12 and the light intensity detector 13 are all disposed on the light path of the light emitted from the laser light source 10. The liquid crystal element to undergo the phase measurement is positioned between the first polarizing plate 11 and the second polarizing plate 12. A power source 14 is connected to the liquid crystal element so as to apply a voltage from the power source 14 to the liquid crystal element, and the voltage applied to the liquid crystal element from the power source 14 is controlled by a control device 15. The liquid crystal element is positioned so that when the liquid crystal molecules therein enter the second alignment direction, the direction along which the liquid crystal molecules are aligned forms a 45° angle with the transmission axis of each of the two polarizing plates.

The light emitted from the laser light source becomes linearly polarized as it is transmitted through the first polarizing plate 11 and the linearly polarized light then enters the liquid crystal elements. While the alignment direction of the liquid crystal molecules in the liquid crystal element sustains the first alignment direction, no birefringence attributable to the liquid crystal material occurs and thus, the polarization direction of the linearly polarized light remains unchanged. This means that the linearly polarized light having been transmitted through the liquid crystal element is not transmitted through the second polarizing plate 12, and for this reason, the intensity of the light detected at the light intensity detector 13 is close to zero. However, under the circumstances that the alignment direction of the liquid crystal molecules in the liquid crystal element is in the second alignment direction, the direction along which the liquid crystal molecules are aligned forms a 45° angle relative to the transmission axis of the first polarizing plate 11 and, as a result, birefringence occurs at the liquid crystal material. This, in turn, alters the linearly polarized light to elliptically polarized light (or circularly polarized light), and part of this elliptically polarized light is transmitted through the second polarizing plate 12 and reaches the light intensity detector 13. Consequently, the light intensity detector 13 is able to detect a certain level of light intensity.

Accordingly, a specific relationship between the voltage V applied to the liquid crystal element and the light intensity I' can be ascertained by measuring the detection target light intensity via the light intensity detector while the control device 15 controls the voltage applied from the power source 14 to the liquid crystal element so as to alter the alignment direction of the liquid crystal molecules from the first alignment direction to the second alignment direction. Namely, the relationship expressed as;

$$I'=f(V) \tag{20}$$

is defined. The relationship expressed as in (18) below exists between the phase retardation achieved via the liquid crystal element and the light intensity.

$$I'(\Delta\varnothing)=(½)\sin^2(\Delta\varnothing/2) \tag{21}$$

Thus, the relationship between the voltage applied to the liquid crystal element and the phase retardation can be determined. In addition, when the voltage application is controlled so as to alter the alignment direction of the liquid crystal molecules in the liquid crystal element currently in the first alignment direction to a given alignment direction between the first alignment direction and the second alignment direction, the relationship expressed as in (21) below exists between the effective refractive index change and the phase modulation.

$$\Delta\varnothing=2\pi d(n_{eff}(\lambda)-n_o(\lambda))/\lambda \tag{22}$$

In the expression (22), $n_{eff}(\lambda)$ represents the effective refractive index for light having a wavelength $\lambda$ in the given alignment direction of the liquid crystal molecules between the first alignment direction and the second alignment direction. Accordingly, the relationship between the intermediate refractive index $n_{eff}(\lambda)$ at the liquid crystal element and the voltage V applied to the liquid crystal element can be determined by using expressions (20) through (22). The relationship between the intermediate refractive index $n_{eff}(\lambda)$ and the applied voltage V is determined through the procedure described above for each of the liquid crystal elements selected to configure a phase modulator.

Through the processes described above, the values representing the voltage to be applied to each liquid crystal element comprising the phase modulator are determined each in correspondence to a specific extent of phase modulation among varying extents of phase modulation within the range of 0 through $2\pi$rad. These voltage values are stored, each in correspondence to a value representing a specific extent of phase modulation, in the form of a voltage application data table into a storage unit (not shown) of the control device.

[Examples of Achromatic Phase Modulators]

Examples of achromatic phase modulators will described below. FIG. 1 schematically illustrates an achromatic phase modulator 100 configured by disposing two liquid crystal elements in series. The two liquid crystal elements are connected with power sources 14 that provide voltages to be applied to the respective liquid crystal elements. A control device 15 controls the voltages to be applied from the power sources 14 to the liquid crystal elements. It is to be noted that there are no restrictions whatsoever with respect to the order in which the two liquid crystal elements are disposed. As linearly polarized light sequentially passes through the two liquid crystal elements, the phase of the linearly polarized light undergoes achromatic phase modulation.

In addition, FIG. 10 schematically illustrates an achromatic phase modulator 200 configured by disposing three liquid crystal elements in series. The three liquid crystal elements are connected with power sources 214 that provide voltages to be applied to the respective liquid crystal elements. A control device 215 controls the voltages to be applied from the power sources 214 to the liquid crystal elements. It is to be noted that there are no restrictions whatsoever with respect to the order in which the three liquid crystal elements are disposed. As linearly polarized light sequentially passes through the three liquid crystal elements, the phase of the linearly polarized light undergoes achromatic phase modulation.

[Example of Method For Measuring Phase Modulation Error]

Figure 11:
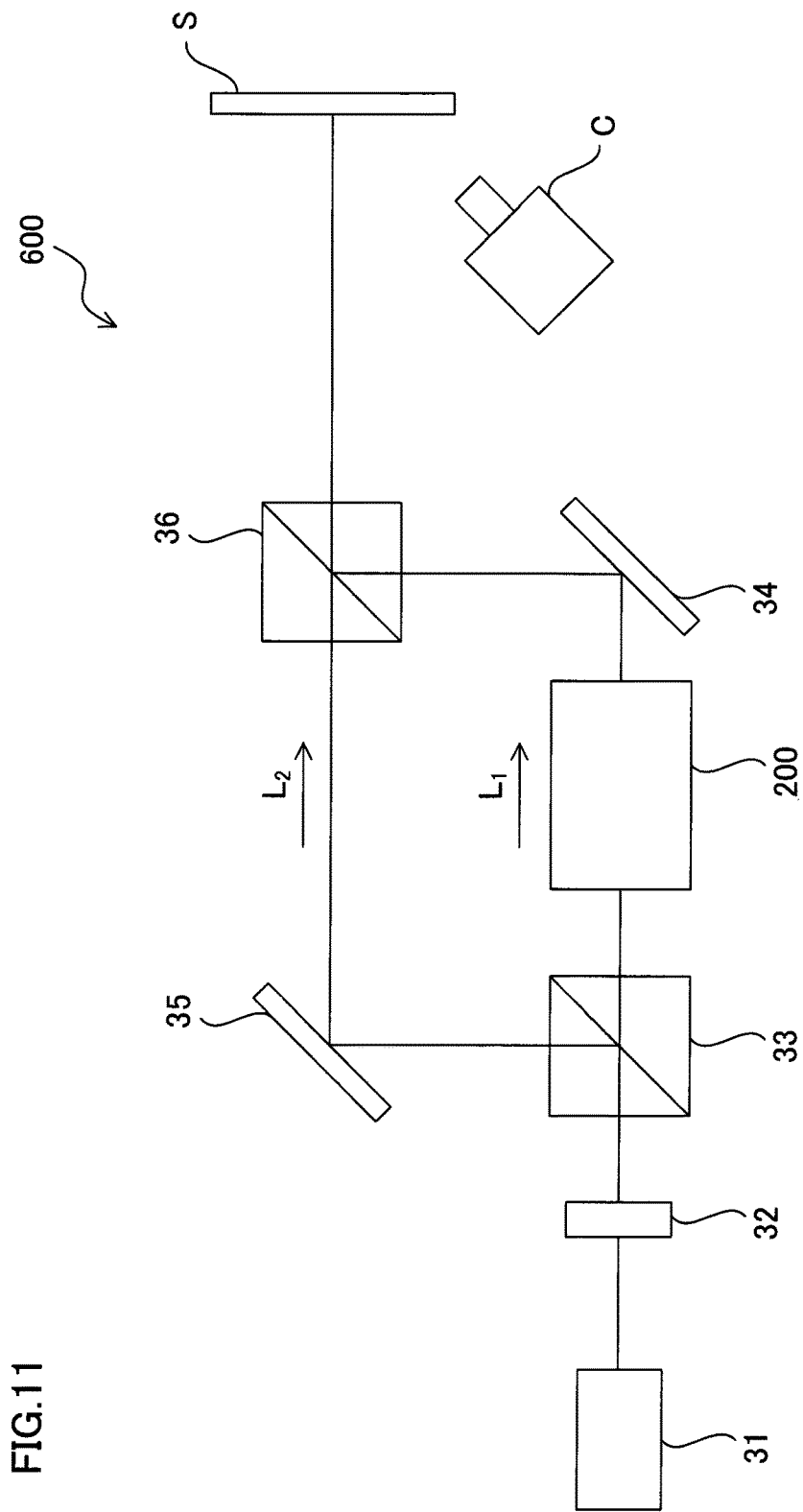
FIG. 11 is a schematic diagram showing the structure of a Mach-Zehnder type interference measurement device engaged in measurement of the phase modulation achieved by a phase modulator.

One example of method for measuring phase modulation error will be described below. The phase modulator 100 or 200 is set at a Mach-Zehnder interferometer 600, as shown in FIG. 11, in order to measure the phase modulation achieved by the phase modulator. FIG. 11 shows the phase modulator 200 set at the Mach-Zehnder interferometer. Light emitted from a laser light source 31 becomes linearly polarized as it passes through a polarizing plate 32 and the linearly polarized light then enters a beam splitter 33. The light exiting the beam splitter 33 travels on two separate light paths $L_1$ and $L_2$. The phase modulator 200 is disposed in the light path $L_1$. The phase of the light transmitted through the phase modulator 200 is modulated in correspondence to the voltages applied to the two or the three liquid crystal elements therein, the light having undergone the phase modulation is then reflected at a reflecting mirror 34 to enter a beam splitter 36. The light advancing through the light path $L_2$ is reflected at a reflecting mirror 35 and enters the beam splitter 36. Light having traveled through the light path $L_1$ and light having traveled through the light path $L_2$ become superimposed upon each other at the beam splitter 36. The superimposed light is expanded as necessary via a lens and the light is then projected onto a screen S. The light exiting the beam splitter 36, which is made up with the light having undergone the phase modulation as it traveled through the light path $L_1$ and the light having traveled through the light path $L_2$ without undergoing phase modulation, superimposed upon each other, manifests interference and, as a result, interference fringes appear on the screen S.

A He—Ne laser that outputs light having a wavelength of 632.8 nm, for example, is used as the laser light source 31. The power sources 14 or 214 (shown in FIG. 1 or FIG. 10) are controlled so as to apply voltages to the individual liquid crystal elements as indicated in the voltage application data table stored in the storage unit of the control device 15 or 215 (shown in FIG. 1 or FIG. 10). Via the control device 15 or 215, the voltages applied to the individual liquid crystal elements are controlled in correspondence to various target extents of phase modulation, for example, 0 (0π rad), 0.5π rad, 1π rad, 1.5π rad and 2π rad or the like. The move of the interference fringes projected onto the screen S in correspondence to each target phase modulation extent are captured with a CMOS image sensor in a camera C. Then, based upon the shift in the interference fringes having been recorded, the phase modulation that has actually occurred is determined through calculation.

Next, the voltages applied to the individual liquid crystal elements are controlled in correspondence to the various target extents of phase modulation, for example, 0π rad, 0.5π rad, 1π rad, 1.5π rad and 2π rad or the like, by using another laser light source 31 that is a He—Ne laser capable of outputting light having a wavelength of 543.5 nm, for example, through a procedure similar to that described above. The interference fringes projected onto the screen S in correspondence to each target phase modulation extent are captured with a CMOS image sensor in the camera C and shift occurring in the interference fringes are recorded. Then, based upon the shift in the interference fringes having been recorded, the phase modulation that has actually occurred is determined through calculation. Moreover, by measuring in a similar manner by changing the light source to ones having various wavelengths other than above described two wavelengths, it may be possible to measure phase modulation error for more wavelengths of light.

Figure 17:
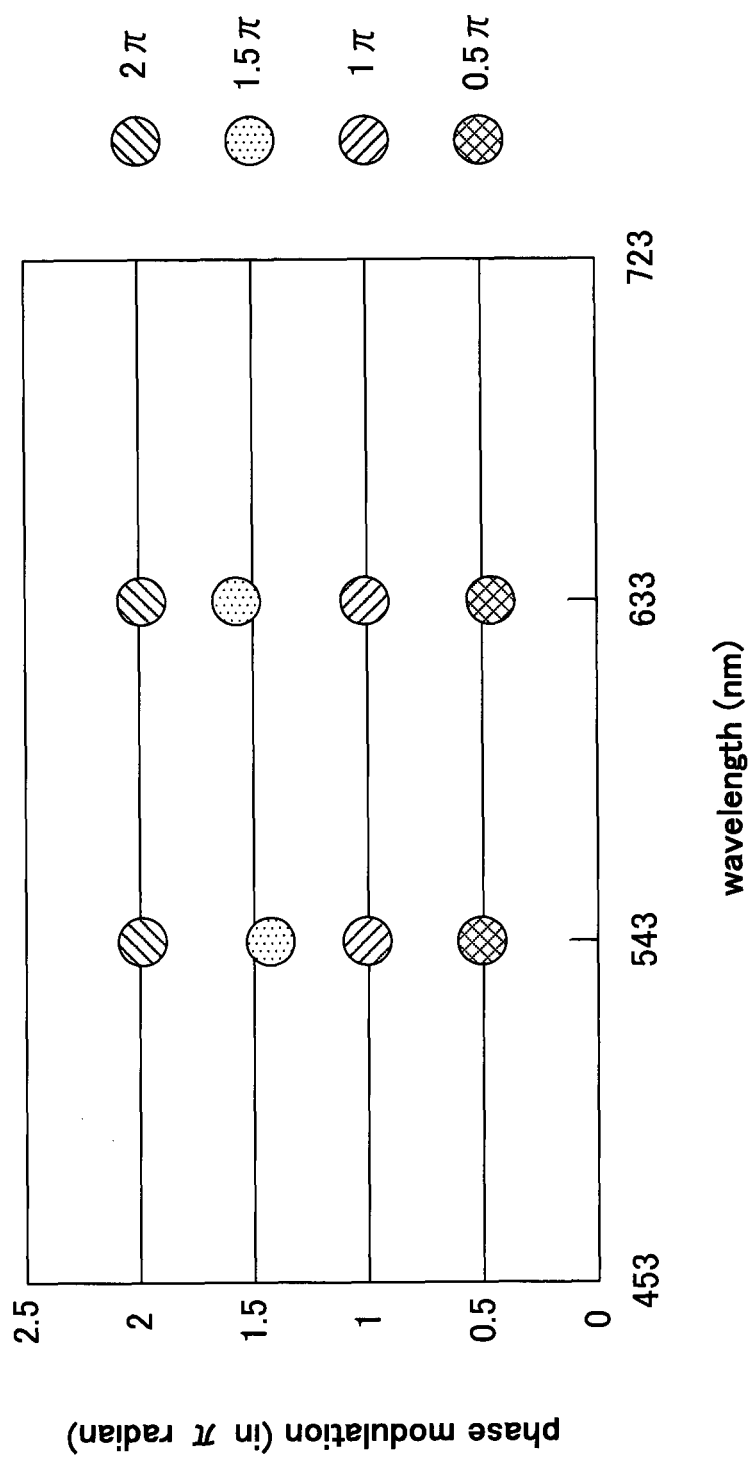
FIG. 17 presents measurement results pertaining to the phase modulation achieved by three liquid crystal elements.

Embodiment 3: Manufacturing of an Achromatic Phase Modulator with Three Liquid Crystal Elements The combination of three liquid crystal materials, MDA-02-2359 (manufactured by Merck) for liquid crystal element 1, MLC-6608 (manufactured by Merck) for liquid crystal element 2 and ZLI-4788 (manufactured by Merck) for liquid crystal element 3, is selected for the phase modulator. Although the combination of these three liquid crystals are the same as those of the Embodiment 2, thicknesses of these three liquid crystal material layers are respectively after manufacturing, 29.92 μm for MDA-02-2359, 21.55 μm for MLC-6608, 20.69 μm for ZLI-4788. The relationship between the effective refractive index $n_{eff}(\lambda)$ and the applied voltage V for each of the three selected liquid crystal elements is determined through the same procedure described in Embodiment 2. In this way, the values representing the voltage to be applied to each of the three liquid crystal elements are determined each corresponding to a specific extent of phase modulation among varying extents of phase modulation within the range of zero through 2π rad. By applying to each of the three liquid crystal elements the specific voltages corresponding to the target extents of phase shift modulation, zero (0π rad), 0.5π rad, 1π rad, 1.5π rad and 2π rad, values of actual phase modulation are measured at the wavelengths of 543 nm and 633 nm. The results of the measurements are showed in FIG. 17. The phase errors for the target extents of phase modulation do not exceed 10%.

The following advantages are achieved through the embodiments described above.

(1) The phase modulator according to the present invention, configured by disposing in series at least two liquid crystal elements constituted with liquid crystal materials demonstrating refractive index wavelength dependence characteristics different from one another, modulates the phase of linearly polarized light under control executed so as to apply specific drive electric signals to the individual liquid crystal elements. Such a phase modulator is capable of achieving achromatic phase modulation for light in a wide wavelength range.

(2) The phase modulator according to the present invention allows the linearly polarized light having entered therein to exit without altering its polarization direction. Thus, achromatic phase modulation, which does not affect the intensity of the exiting light, can be achieved.

(3) In the phase modulator according to the present invention, the alignment directions of the liquid crystal molecules in the individual liquid crystal elements are each altered in the range between the first alignment direction substantially parallel to the direction in which the linearly polarized light advances, and the second alignment direction substantially parallel to the polarization direction of the linearly polarized light, in a plane including the first alignment direction and the second alignment direction. It is thus ensured that the linearly polarized light having entered the phase modulator is allowed to exit without having its polarization direction altered through the phase modulator adopting a simple structure. Also, continuously tunable phase modulation can be achieved.

(4) The liquid crystal elements in the phase modulator according to the present invention are nematic liquid crystal elements that allow the liquid crystal elements to be aligned along predetermined direction. The use of such nematic liquid crystal elements makes it possible to provide an achromatic phase modulator with a simple structure.

(5) The liquid crystal elements in the phase modulator according to the present invention may each include a plurality of separate divisional liquid crystal areas arranged in a two-dimensional array. The use of such liquid crystal elements makes it possible to achieve achromatic phase modulation for the individual pixels.

The embodiments described above allow for the following variations.

(Variation 1)

Figure 15:
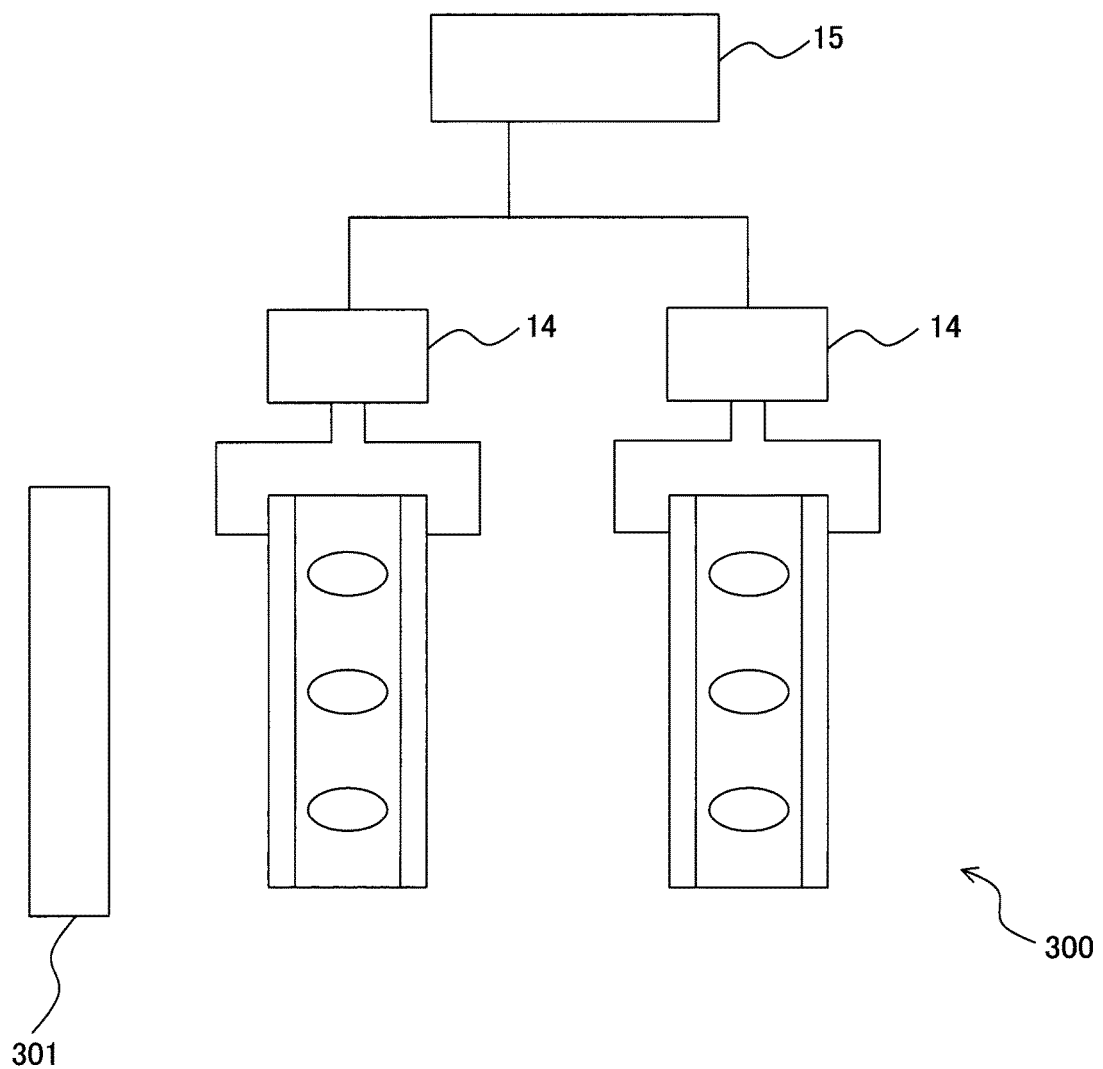
FIG. 15 is a schematic diagram showing the structure of an achromatic phase modulator according to the present invention, which is equipped with a linear polarizer.

In the embodiments described above, linearly polarized light is input to the liquid crystal elements. However, the present invention may be adopted in a configuration further comprising a linear polarizer which first converts unpolarized light to linearly polarized light before the light enters the liquid crystal elements. FIG. 15 shows an achromatic phase modulator 300 adopting this configuration. The linearly polarized light entering the liquid crystal elements is obtained by converting unpolarized light via a linear polarizer 301.

(Variation 2)

In the embodiments described above, the thickness of the liquid crystal material layer in each liquid crystal element is determined based upon the maximum extent of change in the refractive index, i.e., the difference between the ordinary refractive index $n_o$ in the first alignment direction in which the liquid crystal molecules are aligned along the direction perpendicular to the substrate surfaces and the extraordinary refractive index $n_e$ in the second alignment direction in which the liquid crystal molecules are aligned along the direction parallel to the liquid crystal substrate surfaces. However, the present invention is not limited to this example and the thickness of the liquid crystal material layer may instead be determined based upon the difference between the effective refractive indices in any two alignment directions between the alignment direction corresponding to the ordinary refractive index $n_o$ and the alignment direction corresponding to the extraordinary refractive index $n_e$.

(Variation 3)

Figure 16:
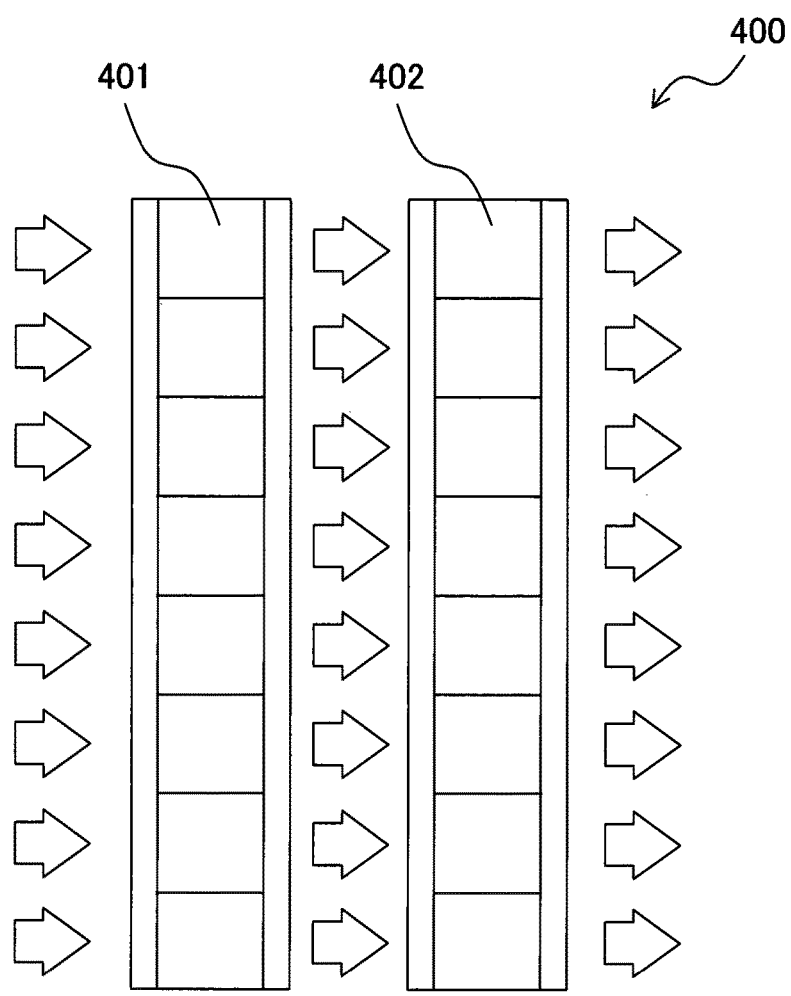
FIG. 16 is a schematic diagram showing the structure of an achromatic phase modulator according to the present invention, configured by using liquid crystal elements each having divisional liquid crystal areas.

The embodiments have been described by assuming that each liquid crystal element is engaged in operation as a whole. However, the present invention is not limited to this example and it may be adopted in conjunction with liquid crystal elements each having a plurality of separate divisional liquid crystal areas arranged in a two-dimensional array. A phase modulator adopting such a configuration should be structured by ensuring that the voltages applied to these separate divisional liquid crystal areas can be individually controlled and that the divisional liquid crystal areas in one liquid crystal substrate are set in correspondence to the divisional liquid crystal areas in another liquid crystal substrate. FIG. 16 shows an achromatic phase modulator 400 adopting this configuration. In the achromatic phase modulator 400 in FIG. 16, divisional liquid crystal areas 401 formed at one liquid crystal element each correspond to one of the divisional liquid crystal areas 402 formed at another liquid crystal element so that light propagates between each pair of divisional liquid crystal areas set in correspondence to each other but light does not propagate from one divisional liquid crystal area to another divisional liquid crystal area that are not in correspondence to each other. It is to be noted that FIG. 16 does not include illustration of the light sources or the control device.

(Variation 4)

The embodiments have been described by assuming that the liquid crystal elements are disposed at positions set apart from one another. However, the present invention is not limited to this example and the liquid crystal elements may be disposed in contact with one another.

(Variation 5)

The embodiments have been described by assuming that the achromatic phase modulators are configured with two or three liquid crystal elements. However, the present invention may be configured with more than three liquid crystal elements.

It is to be noted that the embodiments and variations described above simply represent examples and the present invention is in no way limited to these examples as long as the features characterizing the present invention remain intact. Any other mode conceivable within the technical range of the present invention should, therefore, be considered to be within the scope of the present invention.

EXPLANATION OF REFERENCE NUMERALS 1 substrate
2 liquid crystal material
10, 31 laser light source
11, 12, 32 polarizing plate
13 light intensity detector
14, 214 power source
15, 215 control device
33, 36 beam splitter
34, 35 reflecting mirror
100, 200, 300, 400 phase modulator
401, 402 divisional liquid crystal area
500 phase measuring device
600 Mach-Zehnder interferometer

The invention claimed is:

1. An achromatic phase modulator that modulates phase of a linearly polarized light and outputs the linearly polarized light having undergone phase modulation, comprising:
at least two liquid crystal elements disposed in series on a light path of the linearly polarized light, which are constituted with liquid crystal materials with refractive index wavelength dependence characteristics thereof different from each other; and
a control unit for applying drive electric signals individually to the liquid crystal elements so as to achieve achromatic phase modulation for the linearly polarized light, wherein
in each liquid crystal element, an alignment direction of liquid crystal molecules therein can be altered between a first alignment direction substantially parallel to a direction in which the linearly polarized light advances, and a second alignment direction substantially parallel to the polarization direction of the linearly polarized light, in a plane including the first alignment direction and the second alignment direction, in correspondence to the drive electric signal applied to the liquid crystal element, and the polarization direction of the linearly polarized light entering the phase modulator coincides with the polarization direction of the linearly polarized light exiting the phase modulator.

2. The achromatic phase modulator according to claim 1, wherein:
the linearly polarized light has a wavelength within a visible range.

3. The achromatic phase modulator according to claim 1, further comprising:
a linear polarizer, wherein:
the linear polarizer converts incoming light to the linearly polarized light.

4. The achromatic phase modulator according to claim 1, wherein:
the drive electric signals are each provided as a voltage; and
the liquid crystal elements are all nematic liquid crystal elements.

5. The achromatic phase modulator according to claim 4, wherein:
by setting the alignment direction of the liquid crystal molecules at each liquid crystal element in correspondence to the voltage, a first modulation condition under which an extent of modulation equals a first modulation quantity and a second modulation condition under which the extent of modulation equals a second modulation quantity different from the first modulation quantity can be achieved; and
at one liquid crystal element among the liquid crystal elements, a refractive index for light having a given wavelength in the first modulation condition is greater than the refractive index in the second modulation condition, whereas at another liquid crystal element, the refractive index for light having the given wavelength in the first modulation condition is smaller than the refractive index in the second modulation condition.

6. The achromatic phase modulator according to claim 5, wherein:
the liquid crystal elements are a first liquid crystal element and a second liquid crystal element; and
at the first liquid crystal element, the refractive index for light having the given wavelength in the first modulation condition is greater than the refractive index in the second modulation condition, whereas at the second liquid crystal element, the refractive index for light having the given wavelength in the first modulation condition is smaller than the refractive index in the second modulation condition.

7. The achromatic phase modulator according to claim 6, wherein:
the alignment direction of the liquid crystal molecules in the first liquid crystal element assumes the first alignment direction while the voltage is not being applied thereto whereas the alignment direction of the liquid crystal molecules in the second liquid crystal element assumes the second alignment direction while the voltage is not being applied thereto.

8. The achromatic phase modulator according to claim 5, wherein:
the liquid crystal elements are a first liquid crystal element, a second liquid crystal element and a third liquid crystal element; and
at the first liquid crystal element and the second liquid crystal element, refractive indices for light having the given wavelength in the first modulation condition are both greater than the refractive indices in the second modulation condition, whereas at the third liquid crystal element the refractive index for light having the given wavelength in the first modulation condition is smaller than the refractive index in the second modulation condition at the third liquid crystal element, or at the first liquid crystal element and the second liquid crystal element, refractive indices for light having the given wavelength in the first modulation condition are both smaller than the refractive indices in the second modulation condition, whereas at the third liquid crystal element the refractive index for light having the given wavelength in the first modulation condition is greater than the refractive index in the second modulation condition at the third liquid crystal element.

9. The achromatic phase modulator according to claim 8, wherein:
the alignment directions of the liquid crystal molecules at the first liquid crystal element, the second liquid crystal element and the third liquid crystal element are all in the first alignment direction while no voltage is being applied thereto.

10. The achromatic phase modulator according to claim 1, wherein:
thicknesses of liquid crystal material layers at the liquid crystal elements are set so as to achieve any extents of phase modulation falling within the range between zero and the maximum phase modulation by controlling the drive electric signals to be applied to each of the liquid crystal elements.

11. The achromatic phase modulator according to claim 1, wherein:
any extents of phase modulation falling within the range between zero and the maximum phase modulation can be obtained by controlling the drive electric signals to be applied to each of the liquid crystal elements.

12. The achromatic phase modulator according to claim 1, wherein:
the thicknesses of the liquid crystal material layers at the liquid crystal elements are all set equal to or less than 30 µm.

13. The achromatic phase modulator according to claim 1, wherein:
the liquid crystal elements are each divided into a plurality of separate divisional liquid crystal areas arranged in a two-dimensional array;
the divisional liquid crystal areas arrayed at one liquid crystal element corresponds to the divisional liquid crystal areas at another liquid crystal element; and
the control means executes control so as to apply a drive electric signal individually to each of the divisional liquid crystal areas.

14. An optical device comprising the achromatic phase modulator according to claim 1.

15. The optical device according to claim 14, wherein a haze is equal to 2% or less.

* * * * *